(12) United States Patent
Sloman

(10) Patent No.: US 9,163,911 B2
(45) Date of Patent: Oct. 20, 2015

(54) VEHICLE STABILIZATION IN THE EVENT OF LARGE DETONATION

(75) Inventor: Roger Mark Sloman, Ashbourne (GB)

(73) Assignee: Roger Mark Sloman, Ashbourne Derbyshire (GB)

( * ) Notice: Subject to any disclaimer, the term of this patent is extended or adjusted under 35 U.S.C. 154(b) by 0 days.

(21) Appl. No.: 13/700,245

(22) PCT Filed: Oct. 14, 2010

(86) PCT No.: PCT/GB2010/051732
§ 371 (c)(1),
(2), (4) Date: Jan. 28, 2013

(87) PCT Pub. No.: WO2011/148118
PCT Pub. Date: Dec. 1, 2011

(65) Prior Publication Data
US 2013/0204496 A1    Aug. 8, 2013

(30) Foreign Application Priority Data

May 27, 2010  (GB) .................................. 1008903.5
Sep. 13, 2010  (GB) .................................. 1015228.8

(51) Int. Cl.
| F41H 13/00 | (2006.01) |
| B62D 39/00 | (2006.01) |
| F41H 5/007 | (2006.01) |
| F41B 9/00  | (2006.01) |
| F41H 7/04  | (2006.01) |

(52) U.S. Cl.
CPC ................ *F41H 13/00* (2013.01); *B62D 39/00* (2013.01); *F41B 9/0087* (2013.01); *F41H 5/007* (2013.01); *F41H 7/04* (2013.01); *F41H 7/042* (2013.01)

(58) Field of Classification Search
CPC ................................. F41H 7/042; F41H 5/007
USPC ........... 89/36.02, 36.08, 36.17; 180/295, 299, 180/24.07; 701/45, 36
See application file for complete search history.

(56) References Cited

U.S. PATENT DOCUMENTS

| 2,906,176 A | 9/1959 | Musser |
| 3,580,354 A | 5/1971 | Hewitt |
| 4,686,888 A | 8/1987 | Sanborn et al. |

(Continued)

FOREIGN PATENT DOCUMENTS

| DE | 2121089 | 11/1972 |
| DE | 2205826 | 8/1973 |

(Continued)

OTHER PUBLICATIONS

Communication pusuant to Rule 114(2) EPC, from related EP Application 09764016.3, mailed Apr. 18, 2012, 4 pages.

(Continued)

*Primary Examiner* — Thomas G Black
*Assistant Examiner* — Wae Louie
(74) *Attorney, Agent, or Firm* — Lee & Hayes, PLLC

(57) ABSTRACT

A vehicle, apparatus, method and computer program are provided. The vehicle comprises: vehicle stabilizing means for ejecting at least one non-gaseous mass; means for detecting an explosion local to the vehicle; and control means for controlling, in response to detection of an explosion local to the vehicle, the vehicle stabilizing means to eject at least one non-gaseous mass in order to apply a force to the vehicle and stabilize the vehicle in response to the explosion.

23 Claims, 16 Drawing Sheets

(56) References Cited

U.S. PATENT DOCUMENTS

| | | |
|---|---|---|
| 6,658,984 B2 | 12/2003 | Zonak |
| 6,938,924 B2 | 9/2005 | Feldman et al. |
| 7,594,561 B2 * | 9/2009 | Hass et al. .................... 180/299 |
| 7,908,959 B2 | 3/2011 | Pavon |
| 8,025,005 B2 | 9/2011 | Pavon |
| 8,095,269 B2 | 1/2012 | Pruett et al. |
| 8,316,753 B2 * | 11/2012 | Beach et al. ................. 89/36.17 |
| 8,342,073 B2 * | 1/2013 | Chu et al. ..................... 89/36.01 |
| 8,353,240 B1 * | 1/2013 | Schaedler et al. ........... 89/36.02 |
| 8,365,649 B1 * | 2/2013 | Andrews ...................... 89/36.08 |
| 8,424,443 B2 * | 4/2013 | Gonzalez ..................... 89/36.02 |
| 8,459,167 B1 * | 6/2013 | Gonzalez ..................... 89/36.02 |
| 8,464,626 B2 * | 6/2013 | Adams et al. ................ 89/36.02 |
| 8,464,816 B2 * | 6/2013 | Carrier ....................... 180/24.07 |
| 8,636,972 B1 * | 1/2014 | Imholt ....................... 423/445 B |
| 2004/0200347 A1 | 10/2004 | Grosch |
| 2005/0230176 A1 | 10/2005 | Wang |
| 2007/0186762 A1 | 8/2007 | Dehart et al. |
| 2009/0266226 A1 * | 10/2009 | Beach et al. ................. 89/36.02 |
| 2010/0102596 A1 | 4/2010 | Chapman |
| 2010/0163330 A1 * | 7/2010 | Halliday ...................... 180/295 |
| 2010/0185354 A1 | 7/2010 | Pruett et al. |
| 2010/0275766 A1 | 11/2010 | Joynt et al. |
| 2011/0072960 A1 * | 3/2011 | Hallissy et al. ............. 89/36.02 |
| 2011/0148147 A1 | 6/2011 | Tunis et al. |
| 2012/0180642 A1 * | 7/2012 | Pavon .......................... 89/36.17 |
| 2012/0185129 A1 * | 7/2012 | Carrier ........................... 701/36 |
| 2012/0192706 A1 * | 8/2012 | Gonzalez ..................... 89/36.02 |
| 2012/0193940 A1 | 8/2012 | Tunis et al. |
| 2012/0247315 A1 * | 10/2012 | Treadway et al. .......... 89/36.02 |
| 2013/0036899 A1 * | 2/2013 | Tucker ......................... 89/36.02 |
| 2013/0061739 A1 * | 3/2013 | Cheong et al. ............... 89/36.02 |
| 2013/0092016 A1 * | 4/2013 | Sales ............................ 89/36.08 |
| 2013/0152774 A1 * | 6/2013 | Gonzalez ..................... 89/36.02 |
| 2013/0204496 A1 * | 8/2013 | Sloman ........................... 701/45 |
| 2013/0284003 A1 * | 10/2013 | Dodworth .................... 89/36.02 |
| 2013/0319215 A1 * | 12/2013 | Parida et al. ................. 89/36.02 |
| 2014/0007761 A1 * | 1/2014 | Haidar ......................... 89/36.02 |

FOREIGN PATENT DOCUMENTS

| | | |
|---|---|---|
| DE | 4305616 | 8/1994 |
| DE | 19631715 A1 | 2/1998 |
| DE | 19909905 | 2/2001 |
| DE | WO2006108613 A1 | 10/2006 |
| EP | 1431700 | 6/2006 |
| WO | WO0239048 A2 | 5/2002 |
| WO | WO2006037314 A1 | 4/2006 |
| WO | WO2010067093 A1 | 6/2010 |
| WO | WO2011075174 A1 | 6/2011 |
| WO | WO2011148118 | 12/2011 |

OTHER PUBLICATIONS

International Search Report from corresponding International Application No. PCT/GB2009/051609, dated Nov. 27, 2009, 6 pages.

International Search Report from corresponding International Application PCT/GB2010/051732 dated Jul. 21, 2011, 7 pages.

Final Office Action for U.S. Appl. 13/133,280, mailed on Feb. 24, 2014, Roger Mark Sloman, "Vehicle Stabilization", 9 pages.

EP Search Report for Application No. 14151928.0-1655, mailed Mar. 27, 2014, 6 pgs.

Invitation to Respond to Written Opinion from the Intellectual Property Office of Singapore, Application No. 2012086260, mailed on Feb. 28, 2014, 7 pgs.

North Atlantic Treaty Organisation, Research and Technology Organisation, "Test Methodology for Protection of Vehicle Occupants Against Anti-Vehicular Landmine Effects," Final Report of HFM-090 Task Group 25, RTO Technical Report, TR-HFM-090, Apr. 2007, 8 pages.

Office action for U.S. Appl. No. 13/133,280 mailed on Sep. 11, 2014, Sloman, "Vehicle Stabilization", 8 pages.

EP Search Report for Application No. 14167383.0-1503, mailed Jul. 22, 2014, 4 pages.

* cited by examiner

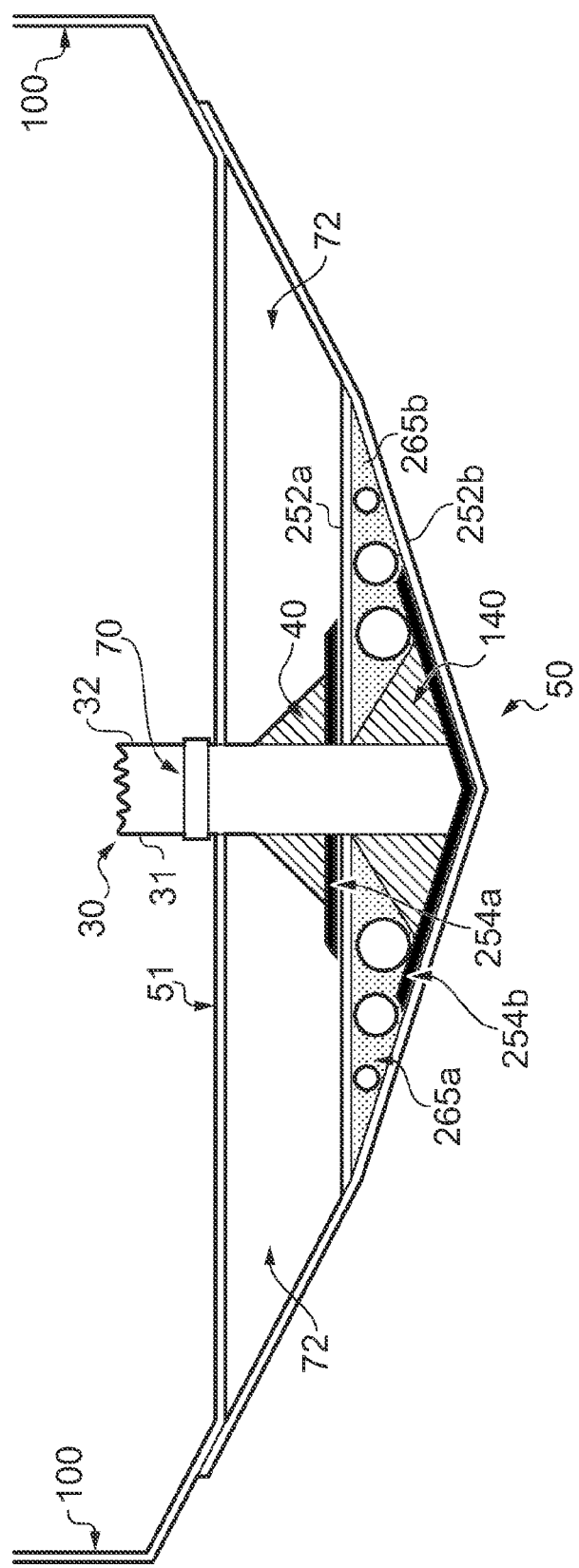

VEHICLE STABILIZATION IN THE EVENT OF LARGE DETONATION

CROSS REFERENCE TO RELATED APPLICATIONS

This application is a 35 U.S.C. 371 National Stage Application of International Application No. PCT/GB2010/051732, filed Oct. 14, 2010, which claims priority to GB1008903.5, filed on May 27, 2010 and GB1015228.8, filed on Sep. 13, 2010, the entire contents of which are incorporated herein by reference.

FIELD OF THE INVENTION

Embodiments of the present invention relate to vehicle stabilization. In particular, they relate to stabilizing an armored vehicle in response to an explosion.

BACKGROUND TO THE INVENTION

Armored vehicles comprise armor for protecting the vehicle and its occupants against projectiles, shrapnel and blast emanating from explosive devices, such as mines or improvised explosive devices (IED's).

BRIEF DESCRIPTION OF VARIOUS EMBODIMENTS OF THE INVENTION

According to various, but not necessarily all, embodiments of the invention there is provided a vehicle, comprising: vehicle stabilizing means for ejecting at least one non-gaseous mass; means for detecting an explosion local to the vehicle; and control means for controlling, in response to detection of an explosion local to the vehicle, the vehicle stabilizing means to eject at least one non-gaseous mass in order to apply a force to the vehicle and stabilize the vehicle in response to the explosion.

According to various, but not necessarily all, embodiments of the invention there is provided an apparatus, comprising: vehicle stabilizing means for applying a force to a vehicle by ejecting at least one non-gaseous mass; means for detecting an explosion local to a vehicle; and control means for controlling, in response to detection of an explosion local to a vehicle, the vehicle stabilizing means to eject at least one non-gaseous mass in order to apply a force to the vehicle and stabilize the vehicle in response to the explosion.

The control means may be for controlling, in response to detection of an explosion local to a vehicle, the vehicle stabilizing means to eject at least one non-gaseous mass in order to apply a force having a groundwards component to the vehicle.

The vehicle stabilizing means may be arranged to eject at least one non-gaseous mass within 5 milliseconds of the detection of an explosion local to a vehicle.

The vehicle stabilizing means may be arranged to eject at least one non-gaseous mass within 1 millisecond of the detection of an explosion local to a vehicle.

The vehicle stabilizing means may comprise at least one exploding detonator for causing at least one non-gaseous mass to be ejected. The at least one exploding detonator may comprise at least one explosive which is arranged to cause at least one other explosive, external to the at least one exploding detonator, to detonate in order to eject at least one non-gaseous mass.

The vehicle stabilizing means may comprise at least one chamber containing pressurized gas. The at least one exploding detonator may be arranged to break at least one wall of the at least one chamber to eject at least one non-gaseous mass.

The vehicle stabilizing means may comprise at least one chamber containing inflammable gas. The vehicle stabilizing means may be arranged to ignite the inflammable gas, in response to input from the control means, to eject at least one non-gaseous mass.

The vehicle and the apparatus may further comprise force channeling means, for channeling the force generated by the vehicle stabilizing means towards a base of the vehicle.

The vehicle and the apparatus may further comprise: force distributing means for distributing the generated force in a plurality of different directions across the base, in order to mitigate damage to the base.

The vehicle stabilizing means may comprise a plurality of vehicle stabilizing devices. The control means may be configured to sequentially activate at least some of the vehicle stabilizing devices, in response to detection of an explosion local to the vehicle. The control means may be configured to sequentially activate at least some of the vehicle stabilizing devices in a predetermined order.

The control means may be for controlling the vehicle stabilizing means in dependence upon at least one characteristic of the input from the means for detecting an explosion. The means for detecting an explosion may be pressure detection means. The at least one characteristic of the input may indicate, to the control means, the magnitude of the increase in pressure caused by the explosion. The control means may be for controlling the vehicle stabilizing means in dependence upon the indicated magnitude.

The at least one characteristic may indicate, to the control means, a position at which pressure has increased due to the explosion. The control means may be for controlling the vehicle stabilizing means in dependence upon the indicated position.

The control means may be for controlling the vehicle stabilizing means in dependence upon predetermined control information. The predetermined control information may depend upon the shape, material of construction, weight and/or the center of gravity of the vehicle.

The vehicle may comprise a body. The means for detecting an explosion may be provided at the underside and/or sides of the body. The means for detecting an explosion may comprise one or more pressure detectors.

The vehicle stabilizing means may be for applying a force having a groundwards component to the vehicle, in order to stabilize the vehicle in response to the explosion. The vehicle stabilizing means may comprise one or more vehicle stabilizing devices.

The vehicle may be an armored vehicle. The armored vehicle may be land-based.

According to various, but not necessarily all, embodiments of the invention there is provided a method, comprising: detecting an explosion local to a vehicle; and controlling, in response to detection of the explosion local to the vehicle, vehicle stabilizing means to eject at least one non-gaseous mass in order to apply a force to the vehicle and stabilize the vehicle in response to the explosion.

The vehicle stabilizing means may be controlled to eject the at least one non-gaseous mass in order to apply a force having a groundwards component to the vehicle.

The vehicle stabilizing means may eject the at least one projectile within 5 milliseconds of the detection of the explosion local to the vehicle.

The vehicle stabilizing means may eject the at least one projectile within 1 millisecond of the detection of the explosion local to the vehicle.

At least one exploding detonator may be controlled to explode to cause the at least one non-gaseous mass to be ejected. The at least one exploding detonator may comprise at least one explosive which causes at least one other explosive, external to the at least one exploding detonator, to detonate in order to eject at least one non-gaseous mass.

The vehicle stabilizing means may comprise at least one chamber containing pressurized gas. The exploding detonator may break at least one wall of the at least one chamber, causing ejection of at least one non-gaseous mass.

The vehicle stabilizing means may comprise at least one chamber containing inflammable gas. The inflammable gas may be ignited to eject at least one non-gaseous mass.

The vehicle stabilizing means comprises a plurality of vehicle stabilizing devices. At least some of the vehicle stabilizing devices may be sequentially activated in response to detection of an explosion local to the vehicle. At least some of the vehicle stabilizing devices may be sequentially activated in a predetermined order.

The vehicle stabilizing means may be controlled in dependence upon at least one characteristic of the explosion. The at least one characteristic may comprise an increase in pressure. The vehicle stabilizing means may be controlled in dependence upon the magnitude of the increase in pressure caused by the explosion.

The vehicle stabilizing means may be controlled in dependence upon a position at which the explosion occurred. The vehicle stabilizing means may be controlled in dependence upon a position at which the pressure has increased due to the explosion. The vehicle stabilizing means may be controlled in dependence upon the velocity, weight and/or the location of the center of gravity of the vehicle.

According to various, but not necessarily all, embodiments of the invention there is provided a computer program comprising computer program instructions that, when executed by a processor, enable the method as described above to be performed.

According to various, but not necessarily all, embodiments of the invention there is provided a processor, comprising: a processor interface configured to receive an input from at least one detector, in response to the at least one detector detecting an explosion local to a vehicle; and functional processing circuitry configured, in response to detection of an explosion local to a vehicle, to control at least one vehicle stabilizing device to eject at least one non-gaseous mass in order to apply a force to a vehicle and stabilize the vehicle in response to the explosion.

According to various, but not necessarily all, embodiments of the invention there is provided a vehicle, comprising: at least one detector; at least one vehicle stabilizing device configured to eject at least one non-gaseous mass; an interface configured to receive an input from the at least one detector, in response to detection of an explosion local to the vehicle; and processing circuitry configured, in response to reception of the input from the at least one detector, to control at least one vehicle stabilizing device to eject at least one non-gaseous mass in order to apply a force to the vehicle and stabilize the vehicle in response to the explosion.

According to various, but not necessarily all, embodiments of the invention there is provided apparatus, comprising: at least one detector; at least one vehicle stabilizing device configured to eject at least one non-gaseous mass; an interface configured to receive an input from the at least one detector, in response to the at least one detector detecting an explosion local to a vehicle; and processing circuitry configured, in response to reception of the input from the at least one detector, to control at least one vehicle stabilizing device to eject the at least one non-gaseous mass in order to apply a force to a vehicle and stabilize the vehicle in response to the explosion.

According to various, but not necessarily all, embodiments of the invention there is provided a vehicle, comprising: a plurality of vehicle stabilizing devices for stabilizing the vehicle in response to an explosion; means for detecting an explosion local to the vehicle; and control means for sequentially activating the vehicle stabilizing devices, in response to detection of an explosion local to the vehicle, in order to apply a force to the vehicle and stabilize the vehicle in response to the explosion.

According to various, but not necessarily all, embodiments of the invention there is provided apparatus, comprising: a plurality of vehicle stabilizing devices for stabilizing a vehicle in response to an explosion; means for detecting an explosion local to the vehicle; and control means for sequentially activating the vehicle stabilizing devices, in response to detection of an explosion local to the vehicle, in order to apply a force to the vehicle and stabilize the vehicle in response to the explosion.

Each of the vehicle stabilizing devices may be configured to apply the force to the vehicle by ejecting at least one non-gaseous mass. Each of the vehicle stabilizing devices may be configured to apply a force having a groundwards component to the vehicle.

According to various, but not necessarily all, embodiments of the invention there is provided a method, comprising: detecting an explosion local to a vehicle; and sequentially activating the vehicle stabilizing devices, in response to detection of the explosion, in order to apply a force to the vehicle and stabilize the vehicle in response to the explosion.

According to various, but not necessarily all, embodiments of the invention there is provided a computer program comprising computer program instructions that, when executed by processing circuitry, cause the method described above to be performed.

According to various, but not necessarily all, embodiments of the invention there is provided a vehicle, comprising: a plurality of vehicle stabilizing devices for stabilizing the vehicle in response to an explosion; at least one detector configured to detect an explosion local to the vehicle; and processing circuitry configured, in response to detection of an explosion local to the vehicle, to sequentially activate the vehicle stabilizing devices, in order to apply a force to the vehicle over the period of time and stabilize the vehicle in response to the explosion.

According to various, but not necessarily all, embodiments of the invention there is provided apparatus, comprising: a plurality of vehicle stabilizing devices for stabilizing the vehicle in response to an explosion; at least one detector configured to detect an explosion local to the vehicle; and processing circuitry configured, in response to detection of an explosion local to the vehicle, to sequentially activate the vehicle stabilizing devices, in order to apply a force to the vehicle over the period of time and stabilize the vehicle in response to the explosion.

According to various, but not necessarily all, embodiments of the invention there is provided a vehicle, comprising: a base; force channeling means for channeling a force, exerted on a part of the vehicle located above the base, towards the base; and force distributing means for distributing the force in a plurality of different directions across the base, in order to mitigate damage to the base.

The vehicle may further comprise vehicle stabilizing means for stabilizing the vehicle in response to an explosion. The force channeling means may be for channeling a force generated by the vehicle stabilizing means in response to an explosion, and the force distributing means may be for distributing that force in a plurality of different directions across the base.

The force channeling means may comprise at least one structural member extending from the base to the part of the vehicle. The at least one structural member may comprise at least one column.

The force distributing means may comprise a plurality of distributing members, extending across the base in a plurality of different directions, for distributing the force across the base. The force distributing means may comprise at least one interconnecting member, interconnecting at least two distributing members.

The part of the vehicle located above the base on which the force is exerted may be the roof of the vehicle.

BRIEF DESCRIPTION OF THE DRAWINGS

For a better understanding of various examples of embodiments of the present invention reference will now be made by way of example only to the accompanying drawings in which:

FIG. 16 illustrates a cross section of a second example of a connection between the base of a vehicle and a structural member.

DETAILED DESCRIPTION OF VARIOUS EMBODIMENTS OF THE INVENTION

Figure 1:
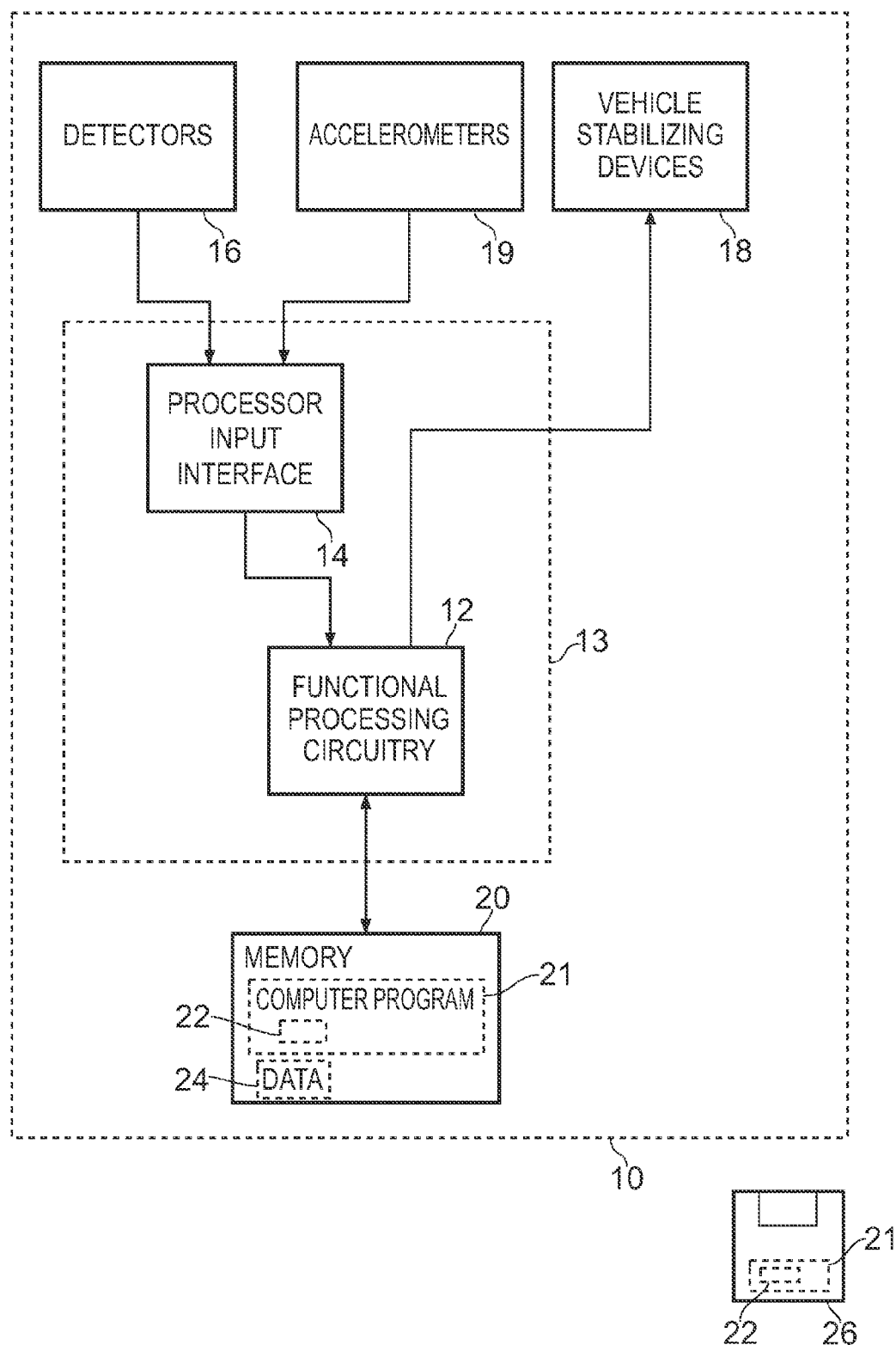
FIG. 1 illustrates an apparatus.

The Figures illustrate a vehicle 2, comprising: vehicle stabilizing means 18 for ejecting at least one non-gaseous mass 52; means 16 for detecting an explosion local to a vehicle 2; and control means 12 for controlling, in response to detection of an explosion local to the vehicle 2, the vehicle stabilizing means 18 to eject at least one non-gaseous mass 52 in order to apply a force to the vehicle 2 and stabilize the vehicle 2 in response to the explosion.

An explosive event can cause significant trauma to a vehicle and/or a vehicle's occupants. In order to protect the occupants of the vehicle from shrapnel and blast emanating from an explosive such as a bomb, mine or improvised explosive device (IED), some vehicles comprise armor.

The armor may protect the occupants against injury caused directly from the shrapnel and blast effects. However, depending upon the size of the explosive, some aspects of the vehicle (such as the floor of the vehicle if the explosion occurs underneath the vehicle) can be very heavily damaged. Furthermore, an explosion underneath or to the side of a vehicle may cause the vehicle to accelerate rapidly into the air, resulting in injury to the occupants either when being accelerated upwards or when the vehicle lands on the ground.

The main upwards acceleration that is generated by the explosion may not occur instantaneously in response to the initial blast shockwave produced by the explosion. Immediately after the explosion occurs, there is an input of energy from the initial shockwave, the following reflected pressure waves, ejecta, and from localized very high pressure gas. Over the next few milliseconds, the gases produced by decomposition of the explosive expand underneath the vehicle and together with other contributors (to the total impulse imparted to the vehicle) may apply a large enough force to cause the vehicle to accelerate upwards into the air and fall onto its side or top. The effect of the expanding gases can be likened to a large airbag expanding very rapidly under the vehicle.

The upwards force that is generated by the expanding gases is at maximum for around 5 milliseconds or so, and then rapidly reduces in value over the next 5 milliseconds to near zero. The ejecta may continue to provide an impulse to the vehicle for another 30-500 milliseconds or so, depending on the depth of the burial of the explosive and the soil type and condition. The proportion of the total impulse imparted to the vehicle by the ejecta is very variable. If the explosive is buried very deeply in a culvert under a road, practically all of the impulse may arise from the ejecta. If the explosive is located on the top of a hard surface there may be very little or no contribution from the ejecta, and practically all of the lifting impulse will be generated by the gas pressure.

Embodiments of the invention relate to an apparatus for stabilizing a vehicle in response to an explosion, in order to prevent or limit injury to the vehicle's occupants, and to maintain the vehicle upright and in fighting condition.

FIG. 1 illustrates an apparatus 10 for stabilizing a vehicle in response to an explosion. The apparatus 10 may be applied to a vehicle during manufacture or post manufacture. The apparatus 10 may, for example, be a kit of parts. The vehicle may be a land-based armored vehicle. For example, the vehicle may be a civilian car, a modified sports utility vehicle, or a military armored vehicle such as a personnel carrier or a tank.

The apparatus 10 comprises control means in the form of a processor 13, detectors 16, vehicle stabilizing devices 18, accelerometers 19 and a memory 20. The processor 13 comprises functional processing circuitry 12 and a processor input interface 14.

The processor input interface 14 is configured to receive inputs from the detectors 16 and the accelerometers 19. The processor input interface 14 is also configured to provide the inputs to the functional processing circuitry 12. The functional processing circuitry 12 is configured to provide an output to the vehicle stabilizing device 18 and to write to and read from the memory 20.

The detectors 16 may be any type of detectors suitable for detecting that an explosion has occurred local to a vehicle.

The detectors 16 may, for example, include: one or more pressure detectors, one or more temperature detectors and/or one or more light detectors.

The pressure detectors may, for example, be piezoelectric pressure detectors. Advantageously, piezoelectric pressure detectors operate effectively in adverse weather and ground conditions.

Alternatively or additionally, the detectors 16 may include one or more break wire detectors. An explosion may cause a circuit of such a break wire detector to break, causing the break wire detector to provide an input to the processor input interface 14.

Alternatively or additionally, the detectors 16 may include one or more ionization detectors for detecting ionized particles that result from an explosion.

Alternatively or additionally, the detectors 16 may comprise one or more electromagnetic pulse detectors for detecting an electromagnetic pulse resulting from an explosion.

The vehicle stabilizing devices 18 are configured to apply a force having a groundwards component to a vehicle. Exemplary implementations of the vehicle stabilizing devices 18 are described in detail below.

The memory 20 is configured to store a computer program 21 comprising computer program instructions 22 and data 24. The data 24 may include control information. The control information is explained in more detail below.

The computer program instructions 22 control the operation of the apparatus 10 when loaded into the processor 13. The computer program instructions 22 provide the logic and routines that enables the apparatus 10 to perform aspects of the method illustrated in FIG. 5.

The computer program may arrive at the apparatus 10 via any suitable delivery mechanism 26. The delivery mechanism 26 may be, for example, a (non-transitory) computer-readable storage medium, a computer program product, a memory device, a record medium such as a compact disc read-only memory (CD-ROM) or digital versatile disc (DVD), an article of manufacture that tangibly embodies the computer program instructions 22. The delivery mechanism may be a signal configured to reliably transfer the computer program instructions 22.

In an alternative implementation, the processor 13 and/or the memory 20 may be provided by an application specific integrated circuit (ASIC).

Figure 2:
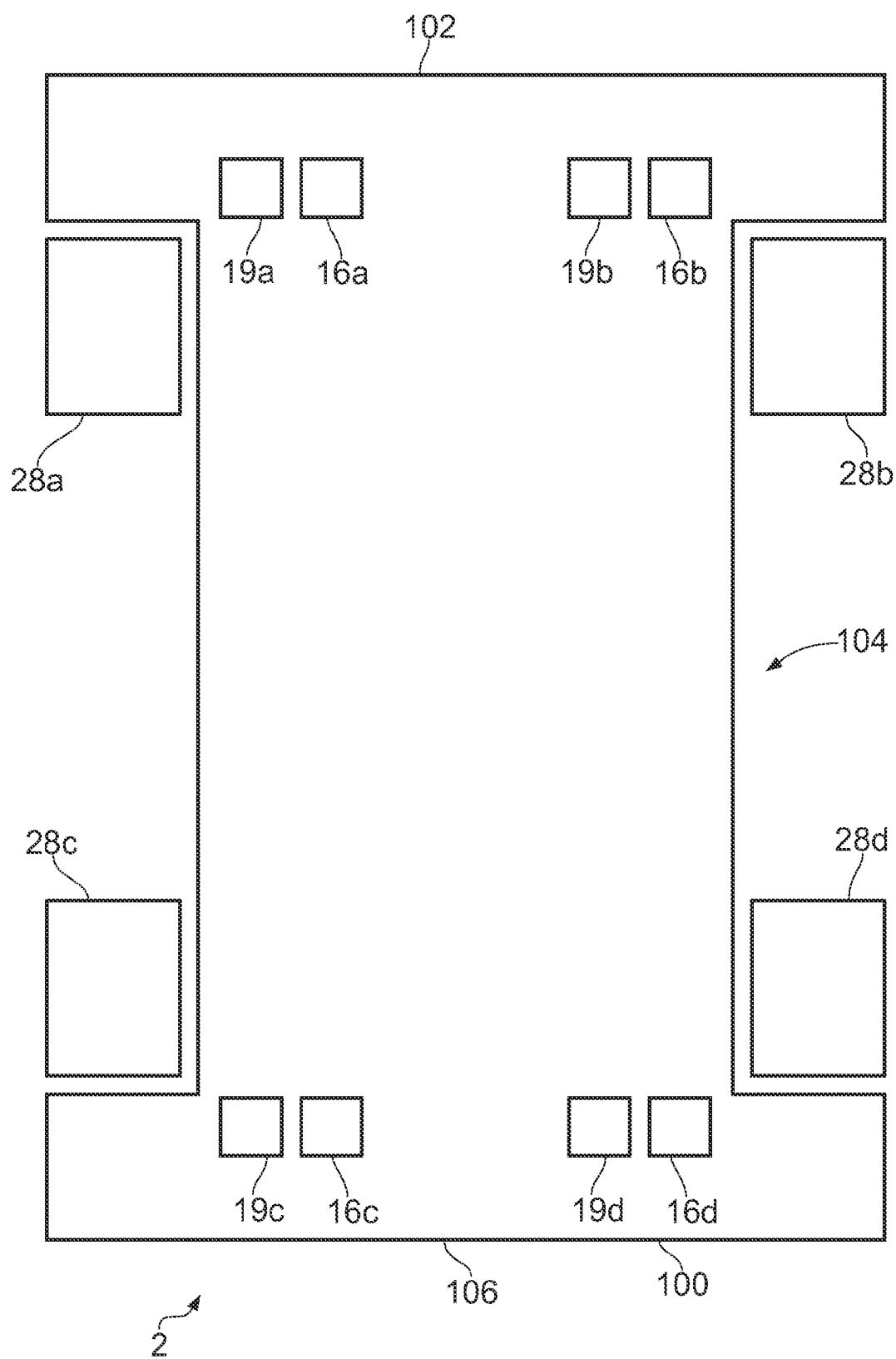
FIG. 2 illustrates the underside of a vehicle.

FIG. 2 illustrates an example of the underside 104 of a vehicle 2 comprising the apparatus 10. The illustrated vehicle 2 comprises a body 100, wheels 28a to 28d, a plurality of detectors 16a to 16d and a plurality of accelerometers 19a to 19d.

Other implementations may have different quantities of wheels, detectors 16 and accelerometers 19 than those illustrated in FIG. 2. Also, in other implementations, the positions of the wheels 28, detectors 16, and accelerometers 19 may be different to those illustrated in FIG. 2.

Figure 3:
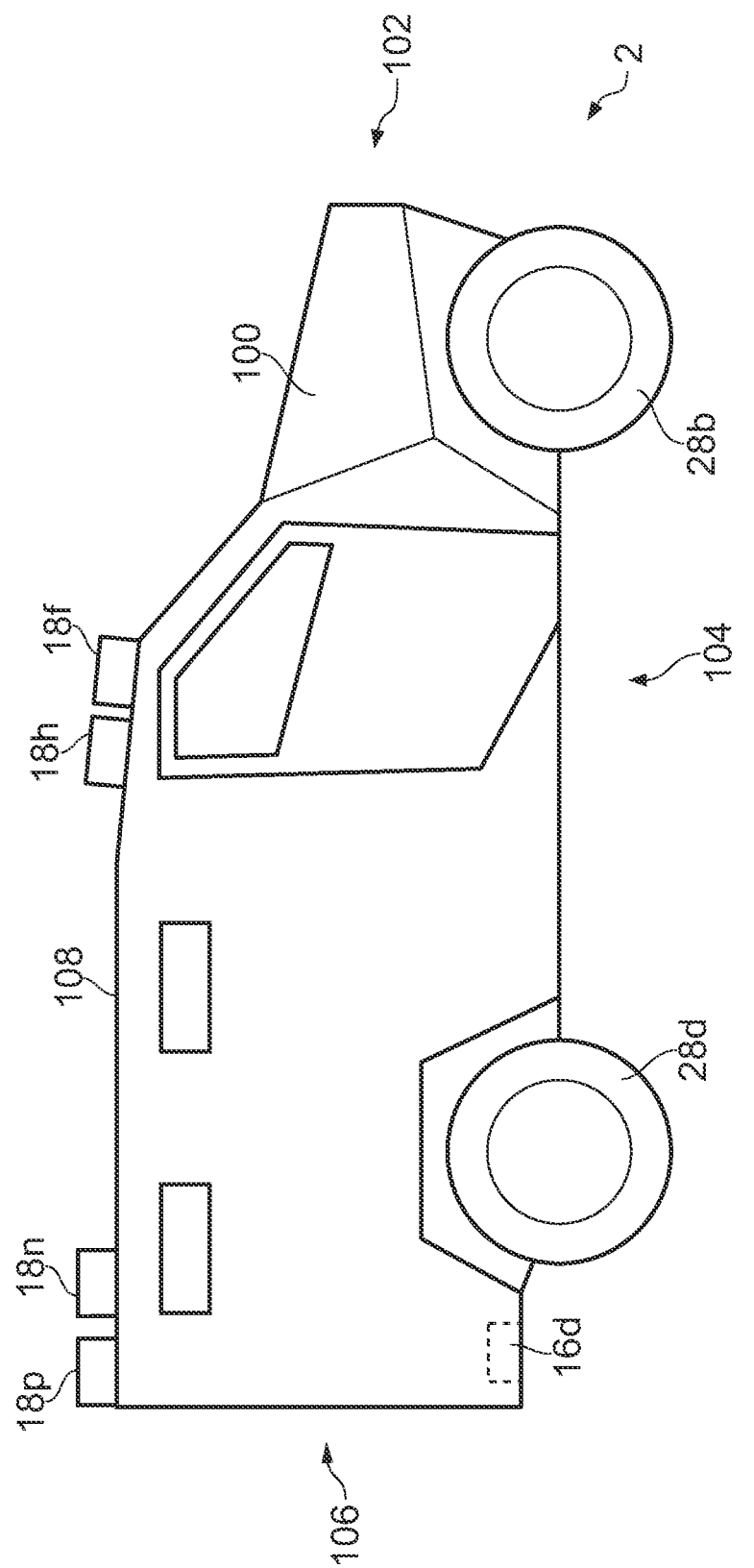
FIG. 3 illustrates a side view of the vehicle.
Figure 4:
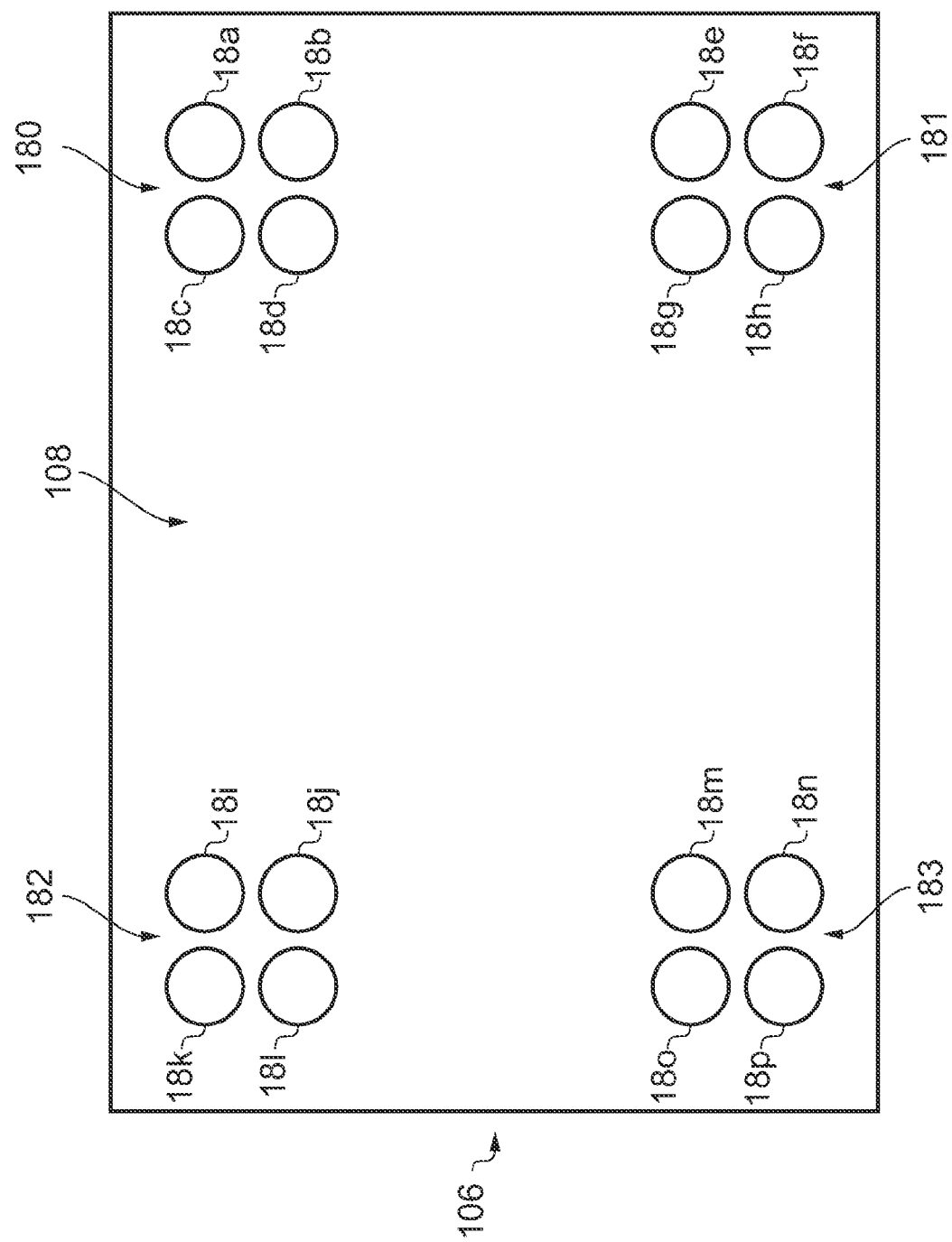
FIG. 4 illustrates a plan view of the roof of the vehicle.

FIG. 3 illustrates a side view of the vehicle 2 of FIG. 2. FIG. 4 illustrates a plan view of the roof 108 of the vehicle 2. In the example illustrated in FIG. 4, sixteen vehicle stabilizing devices 18a to 18p are coupled to the roof 108 of the vehicle 2. However, it will be appreciated by those skilled in the art that any number of vehicle stabilizing devices 18 may be used. The vehicle stabilizing devices 18 may also be situated in different positions to those illustrated in FIG. 4.

In the FIG. 4 example, a cluster 180-183 of vehicle stabilizing devices is located at each corner of the roof 108. Two clusters 180, 181 of vehicle stabilizing devices are located towards the front 102 of the vehicle 2. Two clusters 182, 183 of vehicle stabilizing devices are located towards the rear 106 of the vehicle 2.

Each of the vehicle stabilizing devices 18a-18p may be attached directly to the armored shell of the vehicle 2. In some implementations, each cluster of vehicle stabilizing devices may be located in a further housing, which is attached to the armored shell of the vehicle 2.

A method according to the embodiments of the invention will now be described in relation to FIG. 5. Initially, an explosion occurs at a position that is external to the vehicle 2. The explosion is local to the vehicle 2 and may, for example, occur underneath, in front of, behind or at a side of the vehicle 2. The explosion may occur as a result of the triggering of a bomb, mine or IED (by the vehicle 2 or otherwise).

The explosion causes an initial blast shockwave. At block 400 of FIG. 5, the detectors 16 detect that an explosion has occurred local to the vehicle 2. If pressure detectors are used, the pressure detectors 16 may detect that an increase in pressure has occurred, local to the vehicle, as a result of the initial blast shockwave. The pressure detectors 16 may, for example, detect that pressure has increased underneath the vehicle 2, at a side of the vehicle 2, at the front of the vehicle 2 or at the rear of the vehicle 2.

In response to detecting the increase in pressure, the pressure detectors provide an input to the processor input interface 14. The input may, for example, indicate the direction in which the pressure increased as a result of the explosion, the duration of time over which the pressure increased and/or the extent to which the pressure increased as a result of the explosion.

The processor input interface 14 provides the input from the detectors 16 to the functional processing circuitry 12. The functional processing circuitry 12 then analyzes the input in order to determine whether the input is indicative of an explosion having occurred. An input provided by the detectors 16 following an explosion will have particular characteristics (and will reflect the characteristics of the initial blast shockwave). For example, if pressure detectors are used, the input from the pressure detectors may be indicative of a very large increase in pressure over a very short period of time.

Figure 5:
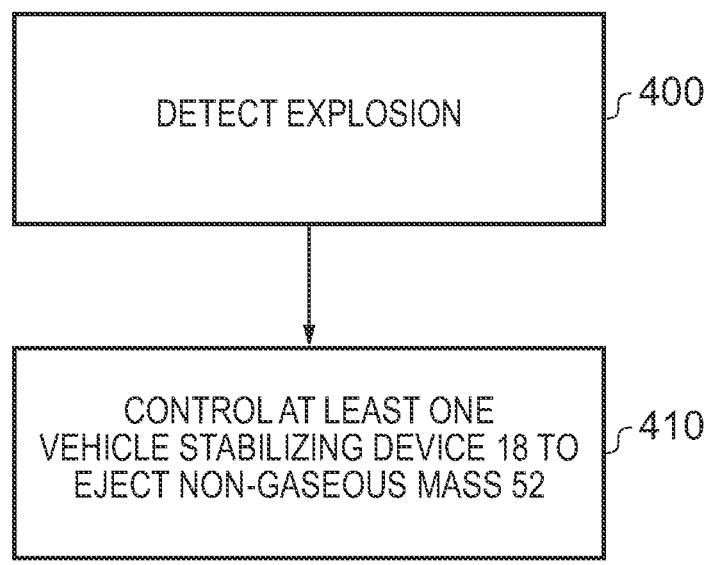
FIG. 5 illustrates a schematic of a method.

After the functional processing circuitry 12 has determined that an explosion has occurred, at block 410 of FIG. 5, the functional processing circuitry 12 controls the vehicle stabilizing devices 18 to apply a force having a groundwards component to the vehicle 2, in order to stabilize the vehicle 2 in response to the explosion.

The functional processing circuitry 12 may, for example, control the vehicle stabilizing devices 18 in dependence upon one or more characteristics of the input from the detectors 16. The one or more characteristics of the input from the detectors 16 may indicate, to the functional processing circuitry 12, the magnitude of the explosion, and/or the position of the explosion.

If pressure detectors are used, the input from the detectors may indicate, to the functional processing circuitry 12, the magnitude of the increase in pressure caused by the explosion, and/or the position(s) at which pressure has increased due to the explosion.

The data 24 stored in the memory 20 may include predetermined control information specifying how the vehicle stabilizing devices 18 are to be controlled when different inputs are received from the detectors 16. The data 24 may, for example, be stored in the form of a look up table.

The control information may be determined during a testing procedure. Different control information may be provided for different vehicles. The control information may, for example, depend upon the shape, material of construction, weight and/or the center of gravity of the vehicle. Different portions of the control information may specify how the vehicle stabilizing devices 18 are to be controlled when the vehicle is travelling at different velocities.

When the input from the detectors 16 is received by the functional processing circuitry 12, the functional processing circuitry 12 matches the input with the appropriate portion of control information. The functional processing circuitry 12 determines how to control the vehicle stabilizing devices from the identified portion of control information and controls the vehicle stabilizing devices 18 appropriately.

In some embodiments of the invention, the functional processing circuitry 12 may obtain inputs (via the input interface 14) from the accelerometers 19 to verify that an explosion has occurred. For example, a mine explosion under a vehicle causes the structure of the vehicle to vibrate in a particular manner. In these embodiments of the invention, the functional processing circuitry 12 may only activate the vehicle stabilizing devices 18 if the input from accelerometers 19 verifies that an explosion has occurred.

In some examples, input from pressure detectors may indicate to the functional processing circuitry 12 that some pressure detectors have detected a larger increase in pressure than others. The functional processing circuitry 12 may control a vehicle stabilizing device 18 to apply a force (having a groundwards component) to the vehicle 2 that depends upon the increase in pressure that is detected by a pressure detector (or pressure detectors) adjacent to that vehicle stabilizing device 18.

The order in which each of the detectors 16a to 16d are activated may, for example, indicate the position at which the explosion has occurred to the functional processing circuitry 12 (relative to the vehicle 2). The functional processing circuitry 12 may determine which vehicle stabilizing devices 18a to 18p to activate in dependence upon the order in which the pressure detectors 16a to 16d are activated.

By way of example, consider a situation where an explosion occurs close to the front-right wheel 28b. The detector 16b illustrated in FIG. 2 may detect the explosion prior to the other detectors 16a, 16c and 16d. The functional processing circuitry 12 may control the cluster 181 of vehicle stabilizing devices 18e to 18h situated closest to the detector 16b to apply a larger groundwards force to the vehicle 2 than the other vehicle stabilizing devices 18a-d and 18i-18p. Some or all of the vehicle stabilizing devices 18a to 18d and 18i to 18p in the other clusters 180, 182, 183 may or may not be activated.

The location of the vehicle stabilizing devices 18 may, for example, depend upon the shape of the vehicle 2, and how the vehicle's weight is distributed throughout the vehicle 2. The torque provided to the vehicle 2 by the vehicle stabilizing devices 18 (following activation) may be maximized by locating the vehicle stabilizing devices 18 close to or at the periphery of the vehicle 2. For example, in this regard, at least some of the vehicle stabilizing devices 18 may be located towards the four corners of the vehicle (see FIG. 4).

In some implementations, some or all of the vehicle stabilizing devices 18 may be activated sequentially. For instance, the functional processing circuitry 12 may be configured to sequentially activate the vehicle stabilizing devices 18 in a predetermined order. The predetermined order may, for example, form part of the control information stored as data 24 in the memory 20.

In some examples, the order in which the vehicle stabilizing devices 18 are sequentially activated depends upon the nature of the detected explosion. For instance, the control information may include information indicating which vehicle stabilizing devices 18 should be activated and the order in which those vehicle stabilizing devices 18 should be activated for different types of detected explosion.

In other examples, the order in which the vehicle stabilizing devices 18 are sequentially activated does not depend upon the nature of the detected explosion.

Each vehicle stabilizing device may provide a groundwards impulse, over a period of time, to stabilize the vehicle in response to the explosion. Sequential activation of the vehicle stabilizing devices enables a groundwards force to be provided over a longer period of time, to counteract the forces produced by the explosion over that period.

The groundwards force applied to the vehicle 2 by the vehicle stabilizing devices 18 acts to mitigate the effects of the total forces generated by the combination of the initial blast shockwave, any reflected shockwaves, ejecta, and the expanding gases resulting from the explosion. Consequently, upwards acceleration of the vehicle 2 is reduced or eliminated, enabling trauma to the vehicle's occupants to be minimized.

Following activation of one or more of the vehicle stabilizing devices 18, the functional processing circuitry 12 may monitor inputs provided by one or more of the accelerometers 19 periodically to determine whether the vehicle 2 remains at risk of de-stabilization from the explosion. Once the functional processing circuitry 12 determines that the risk is no longer present (e.g. because the inputs provided by the accelerometers 19 have reduced beyond a threshold level), it may not activate any further vehicle stabilizing devices 18.

Figure 6:
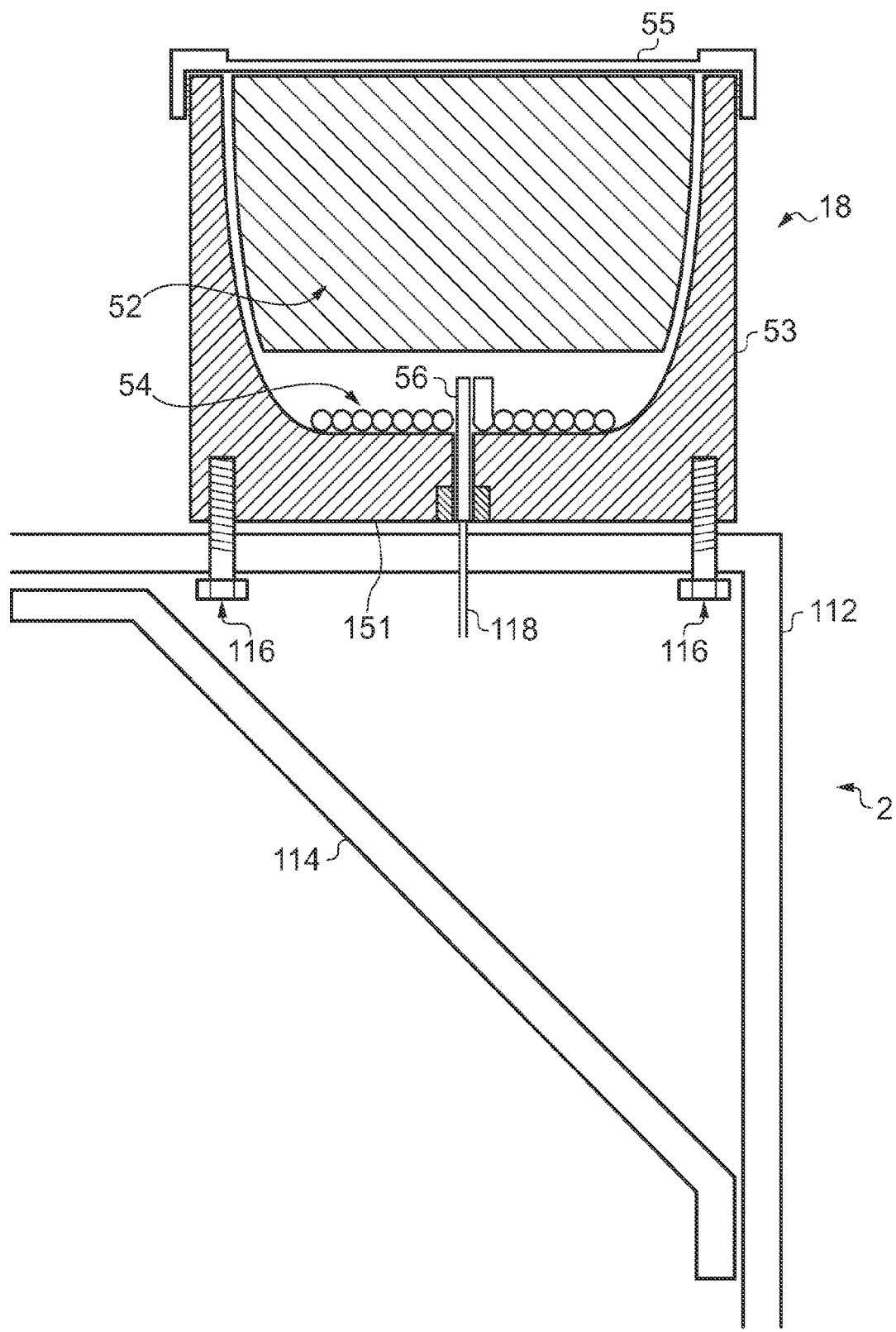
FIG. 6 illustrates a first example of a vehicle stabilizing device.

FIG. 6 illustrates a cross section of first example of a vehicle stabilizing device 18. In the FIG. 6 example, the vehicle stabilizing device 18 comprises a detonator 56, one or more explosive substances 54, a non-gaseous mass 52, a housing 53 and a frangible cover 55. FIG. 6 illustrates the housing 53 of the vehicle stabilizing device 18 fastened to the exterior armored shell 112 of the vehicle 2 by fasteners 116. The underside 151 of the housing 53 is positioned on the exterior armored shell 112 of the vehicle 2. Optionally, a support 114 may be provided to support the force generated by the vehicle stabilizing device 18.

In the FIG. 6 example, the detonator 56, the one or more explosive substances 54 and the non-gaseous mass 52 are housed in the housing 53. The housing 53 may, for example, be cylindrical in shape. The housing 53 has an open end which is covered by the frangible cover 55. The frangible cover 55 prevents the contents of the housing 53 (for example, the detonator 56 and the explosive substance(s) 54 from being affected by the weather).

The detonator 56 may, for example, be an exploding electrical detonator such as an exploding bridge wire detonator or an exploding foil initiator. The detonator 56 has electrical connections 118 for connecting the detonator to an electrical power source. The detonator 56 is used to trigger the one or more explosive substances 54.

The one or more explosive substances 54 are external to the detonator 56 and may, for example, include one or more high explosives such as PETN (pentaerythritol tetranitrate). In the example illustrated in FIG. 6, one or more of the explosive substances 54 are provided by a detonating cord which is wound around the detonator 56. In some embodiments of the invention, the explosive substances 54 may also include flash powder. The flash powder may be made, for example, from potassium perchlorate and aluminum powder.

The non-gaseous mass 52 may comprise one or more solid materials. Additionally, the non-gaseous mass 52 may comprise one or more liquids. For example, in some embodiments of the invention, the non-gaseous mass 52 may be a solid container holding a liquid in use, such as water. In some implementations of the invention, the solid container is made from a plastics material. The weight of the non-gaseous mass 52 may vary depending on the implementation of the invention (for example, depending upon the weight of the vehicle 2 to be stabilized). For the avoidance of doubt, the non-gaseous mass 52 is not ammunition. It is not intended to cause damage to a third party.

As described above, the functional processing circuitry 12 of the apparatus 10 controls a vehicle stabilizing device 18 to apply a force having a groundwards component to the vehicle 2, in order to stabilize the vehicle 2 in response to an explosion. In some implementations of the invention, the apparatus 10 may comprise circuitry, located intermediate the processor 13 and a vehicle stabilizing device 18, which is configured to respond to a signal from the functional processing circuitry 12 by providing a high voltage, high current electrical signal to the detonator 56 of the vehicle stabilizing device 18 (via the electrical connections 118) in order to cause the detonator 56 to explode.

Detonation of the detonator 56 causes the one or more explosive substances 54 to detonate. Detonation of the one or more explosive substances 54 causes the non-gaseous mass 52 to accelerate upwards, break the frangible cover 55 and exit the housing 53 of the vehicle stabilizing device 18.

The non-gaseous mass 52 is ejected from the vehicle stabilizing device 18 and propelled into the air (and away from the vehicle 2) while in non-gaseous form. The non-gaseous mass 52 is effectively a projectile, which may or may not break up as it ejected from housing 53 of the vehicle stabilizing device 18.

Production of the force to eject the non-gaseous mass 52 results in an equal and opposite (reactionary) force being applied to the vehicle 2. In the FIG. 6 example, the reactionary force is transmitted to the vehicle's armored shell 112 by the underside 151 of the housing 53. The non-gaseous mass 52 may, for example, be ejected in a direction that is substantially perpendicular to and away from the ground, in order to produce an appropriate (reactionary) groundwards force for stabilizing the vehicle 2 in response to an explosion.

It is possible to stabilize the vehicle 2 using other types of vehicle stabilizing device that do not eject a non-gaseous mass, such as rocket motors. However, it has been shown during testing that a vehicle stabilizing device 18 that ejects a suitable non-gaseous mass can provide a quicker stabilizing response to an explosion than one which does not. For example, the detonator 56 and one or more explosive substances 54 may detonate and cause ejection of the non-gaseous mass 52 within 5 milliseconds (and in some implementations, less than 1 millisecond) of an explosion being detected, resulting in a reactionary force being provided very quickly.

As mentioned above, vehicle stabilizing devices 18 can be activated sequentially by the processing circuitry 12 in order for a reactionary force to be provided over an extended period of time, to counteract the forces produced by the explosion over that period.

The activation of a particular vehicle stabilizing device 18 may generate a reactionary impulse over a very short period of time (for example, a few milliseconds or less). Sequential activation of the vehicle stabilization devices 18 after an explosion has occurred advantageously enables a reactionary impulse to be provided over a longer period of time.

An advantage of the vehicle stabilizing devices 18 of embodiments of the invention is that the amount of explosive substance 54 that is required may be lower than if a rocket motor were used to apply a stabilizing force of a similar magnitude to the vehicle 2.

Figure 7:
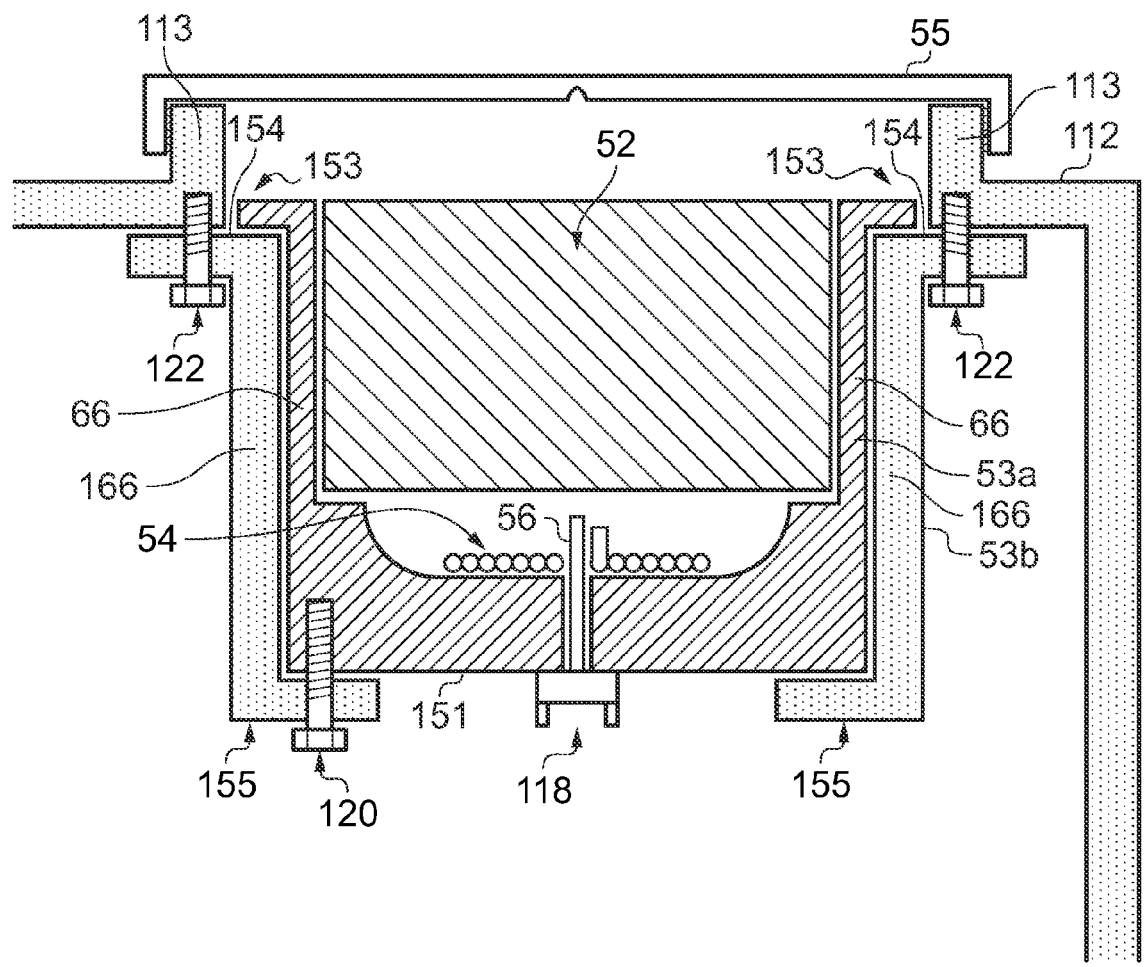
FIG. 7 illustrates a second example of a vehicle stabilizing device.

FIG. 7 illustrates a cross section of a second example of a vehicle stabilizing device 18. The second example operates in the same manner as the first example. The second example differs from first example in that the housing of the vehicle stabilizing device 18 is in two parts 53a and 53b. The inner housing 53a illustrated in FIG. 7 comprises a circumferential wall 66. The circumferential wall 66 of the inner housing 53a may, for example, define the curved surface of a cylinder.

The inner housing 53a houses the non-gaseous mass 52, the detonator 56 and the explosive substance(s) 54. The inner housing 53 is fastened to the outer housing 53b using one or more fasteners 120.

The outer housing 53b has a circumferential wall 166 that surrounds the circumferential wall 66 of the inner housing 53a. The outer housing 53b is fastened to the exterior armored shell 112 of the vehicle 2 using one or more fasteners 122. In the FIG. 7 example, the inner housing 53a comprises a circumferential rim 153 that rests on a shelf of the outer housing 53b. The underside 151 of the inner housing 53a rests on a further shelf 155 of the outer housing 53b.

The vehicle stabilizing device 18 illustrated in FIG. 7 also differs from that illustrated in FIG. 6 in that the frangible cover 55 is situated on an upturned portion 113 of the exterior armored shell 112 of the vehicle 2 (rather than on the housing 53 as in FIG. 6).

Figure 8:
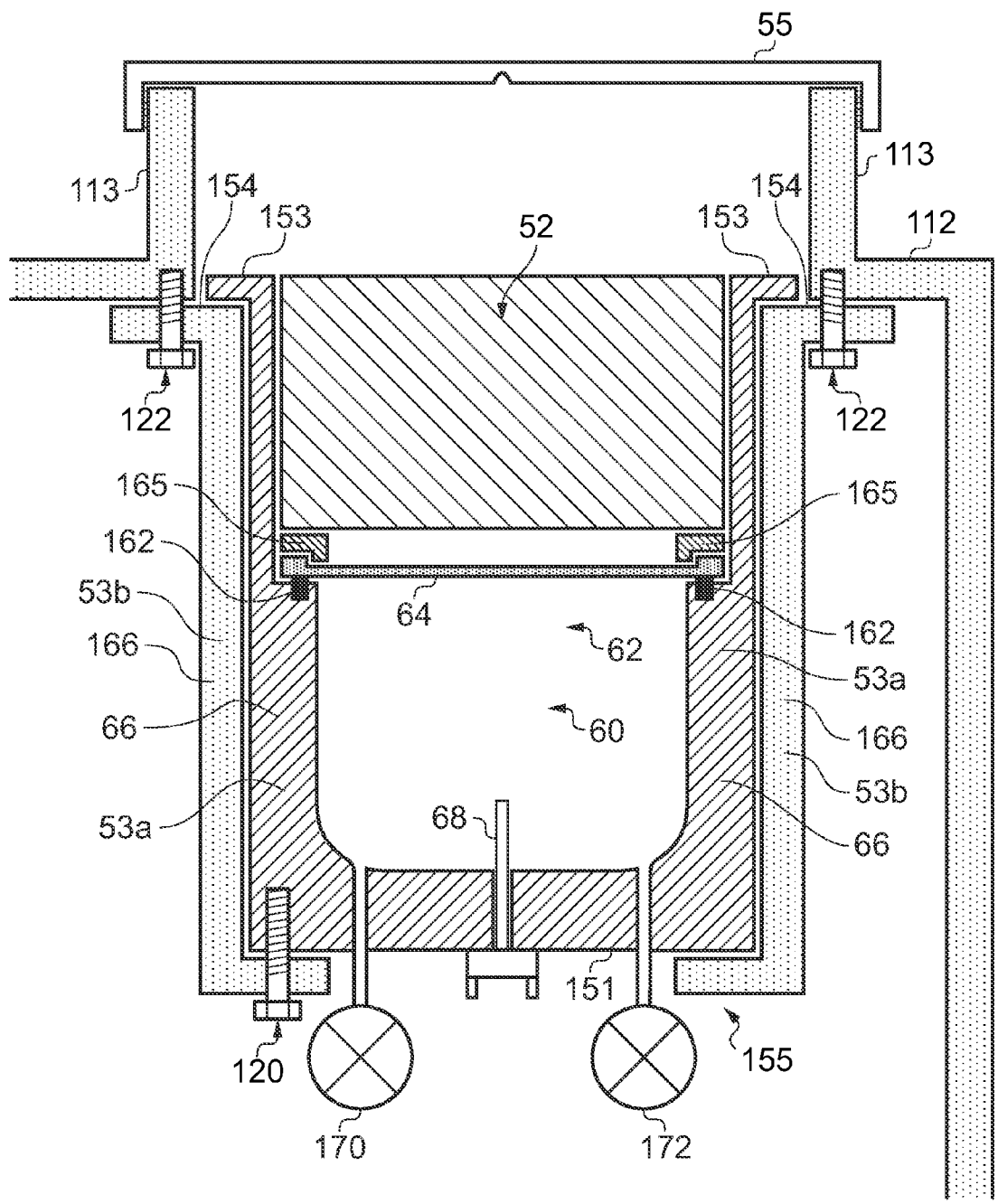
FIG. 8 illustrates a third example of a vehicle stabilizing device.

FIG. 8 illustrates a cross section of a third example of a vehicle stabilizing device 18. The third example of a vehicle stabilizing device 18 includes an inner housing 53a and an outer housing 53b. The inner housing 53a illustrated in FIG. 8 comprises a circumferential wall 66. The circumferential wall 66 of the inner housing 53a may, for example, define the curved surface of a cylinder.

The inner housing 53a houses the non-gaseous mass 52, the detonator 56 and the explosive substance(s) 54. The inner housing 53a is fastened to the outer housing 53b using one or more fasteners 120.

The outer housing 53b has a circumferential wall 166 that surrounds the circumferential wall 66 of the inner housing. The outer housing 53b is fastened to the exterior armored shell 112 of the vehicle 2 using one or more fasteners 122. The inner housing 53a comprises a circumferential rim 153 that rests on a shelf 154 of the outer housing 53b. The underside 151 of the inner housing 53a rests on a further shelf 155 of the outer housing 53b.

A frangible cover 55 is situated on an upturned portion 113 of the exterior armored shell 112 of the vehicle 2.

In this example, the vehicle stabilizing device 18 comprises a chamber 60 and an initiator 68. The chamber 60 contains pressurized gas 62. The pressurized gas 62 may consist of a single gas, or comprise a mixture of different gases. The chamber 60 comprises at least one wall 64 that separates the pressurized gas 62 from a non-gaseous mass 52.

Figure 9:
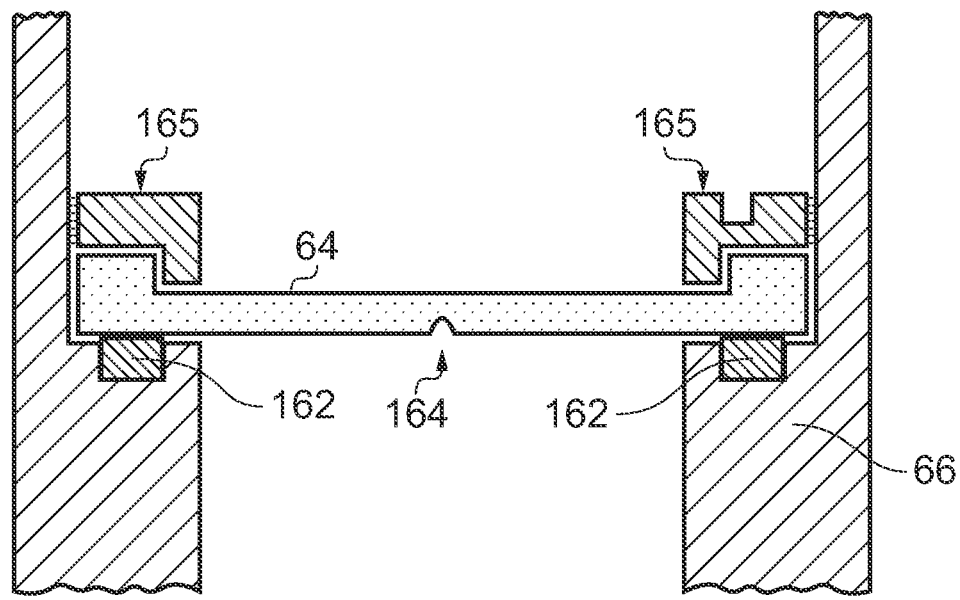
FIG. 9 illustrates a portion of the third example of the vehicle stabilizing device in detail.

A clamp 165, situated inside the inner housing 53a, holds the wall 64 in position against the inner housing 53a. This is illustrated in more detail in FIG. 9. A seal 162 seals the chamber 60 and prevents the pressurized gas 62 from escaping from the chamber 60.

Figure 10:
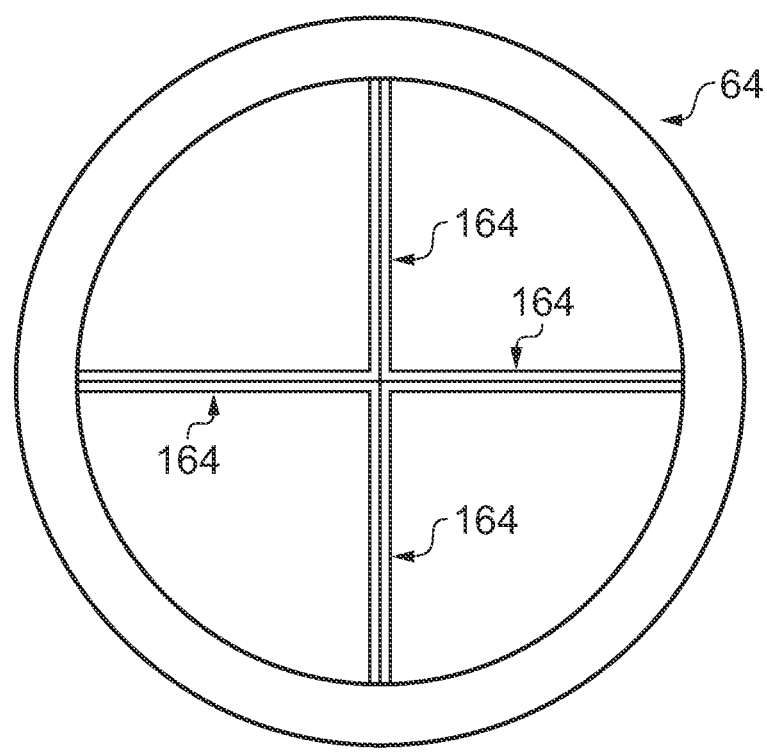
FIG. 10 illustrates a wall comprising weakened portions.

A plan view of the wall 64 is illustrated in FIG. 10. In this example, the wall comprises weakened portions 164. The weakened portions 164 may be made, for example, by machining or scoring a cross into the wall 64.

The initiator 68 of the vehicle stabilizing device 18 illustrated in FIG. 8 is configured to initiate the ejection of the non-gaseous mass 52 from the vehicle stabilizing device 18.

In some implementations of the vehicle stabilizing device 18 illustrated in FIG. 8, the initiator 68 may comprise a detonator, such as the detonator 56 described above in relation to FIG. 6. The initiator 68 may or may not additionally comprise detonating cord. The detonation of the initiator 68 causes the wall 64 to break (for example, at the weakened portions 164) and the pressurized gas 62 to be released from the chamber 60. The release of the pressurized gas 62 produces a force, ejecting the non-gaseous mass 52 from the vehicle stabilizing device 18.

Production of the force to eject the non-gaseous mass 52 results in an equal and opposite (reactionary) force being applied to the vehicle 2. The non-gaseous mass 52 may, for example, be ejected in a direction that is substantially perpendicular to and away from the ground, in order to produce an appropriate groundwards force for stabilizing the vehicle 2 in response to an explosion.

The weakened portions 164 of the wall 64 control how the wall 64 breaks when the initiator 68 is activated. The clamp 165 holds the wall 64 against the circumferential wall 66 such that the pieces of the wall 64 are not ejected from the vehicle stabilizing device 18 when the wall 64 breaks. When the wall 64 fails, it breaks at the weakened portions 614 and quadrants of the wall 64 fold towards the circumferential wall 66 without being ejected. This advantageously prevents sharp pieces being directed towards any crew that may be situated in an observer role on top of the vehicle 2.

The vehicle stabilizing device 18 illustrated in FIG. 8 comprises an inlet valve 170 and an outlet valve 172. A compressor may, for example, be used to pump gas into the chamber 60 via the inlet valve 170. The outlet valve 172 may be used to release gas from the chamber 172.

In some embodiments of the invention according to FIG. 8, the apparatus 10/vehicle 2 may comprise a compressor and a user input device. The user input device may be configured to provide an input to the processor 13, to cause the processor 13 to control the compressor to pump gas into the chamber(s) 60 via the inlet valve 170. Thus, the user input device can be used to control the apparatus 10/vehicle 2 to enter a 'live mode' when the vehicle 2 enters a hazardous situation. The outlet valve 172 may be used to cause the apparatus 10/vehicle 2 to exit the 'live mode'. This enables the apparatus 10 to be configured so that it is only possible for the vehicle stabilizing devices 18 to be activated when the apparatus is in 'live mode'. This advantageously reduces the probability that the vehicle stabilizing devices 18 will be activated in circumstances where they are not required.

In some alternative implementations of the vehicle stabilizing device 18 illustrated in FIG. 8, the pressurized gas 62 is inflammable. In these implementations, the initiator 68 is configured to ignite the inflammable gas (for example, by creating a spark). The increase in pressure that results from the ignition of the inflammable gas 62 causes the wall 64 to break and the non-gaseous mass 52 to be ejected from the vehicle stabilizing device 18.

Figure 11:
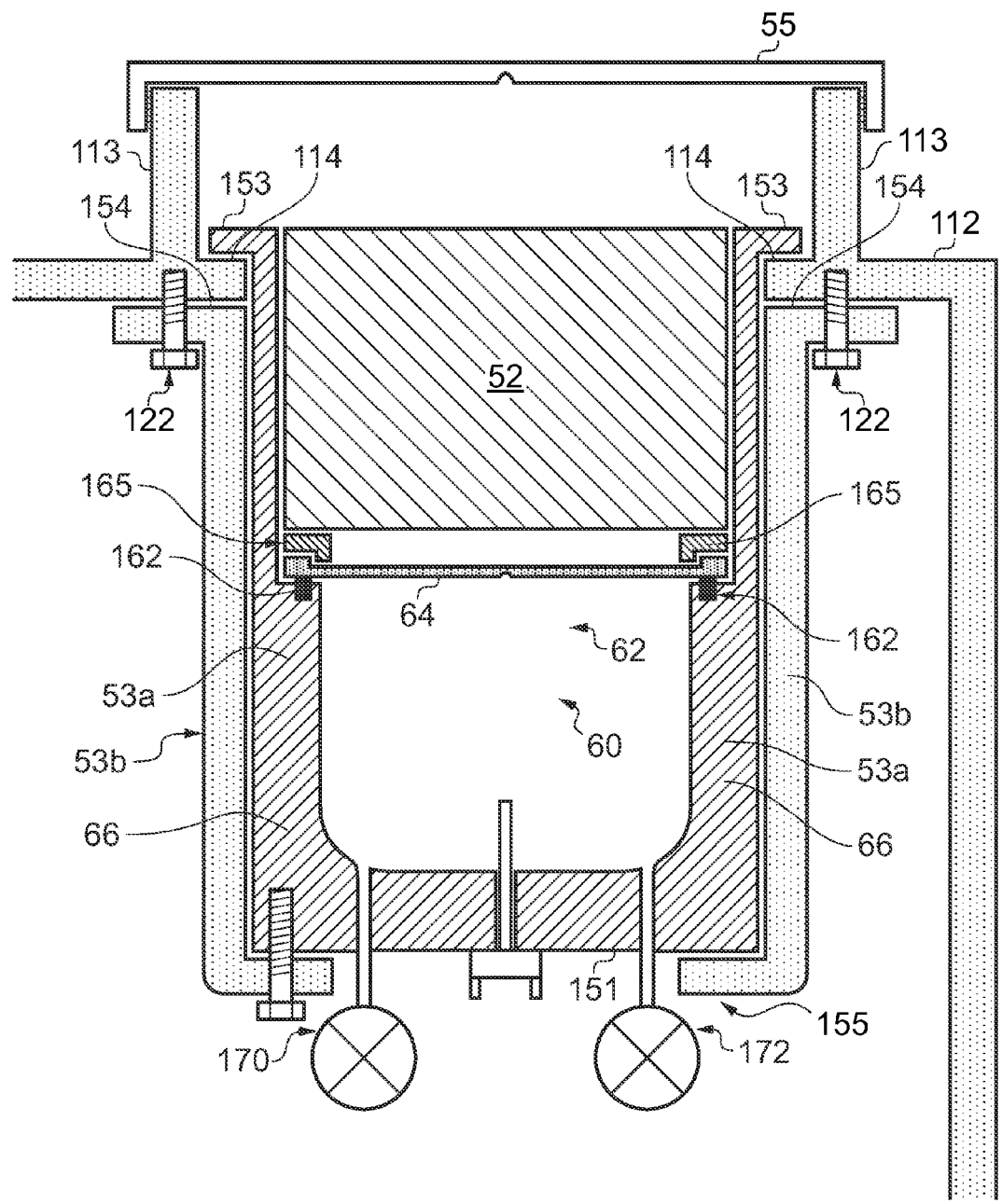
FIG. 11 illustrates a fourth example of a vehicle stabilizing device.

FIG. 11 illustrates a cross section of a fourth example of a vehicle stabilizing device 18. The fourth example is similar to the third example illustrated in FIG. 8. The fourth example is different from the third example in that the circumferential rim 153 of the inner housing 53*a* does not rest directly on the shelf 154 of the outer housing 53*b*. In the FIG. 10 example, the circumferential rim 153 rests on a shelf 114 of the armored shell 112 of the vehicle 2.

FIGS. 8 and 11 illustrate vehicle stabilizing devices 18 that comprise a single chamber 60. However, in some implementations of the invention, vehicle stabilizing devices 18 having multiple chambers may be provided. Adjacent chambers may be separated by walls weakened as described above in relation to FIGS. 8, 9 and 10.

In the multiple chamber embodiments, a pressure differential between the gas in one chamber and the gas in an adjacent chamber may be created to cause the non-gaseous mass 52 to be ejected from the vehicle stabilizing device 18.

Figure 12:
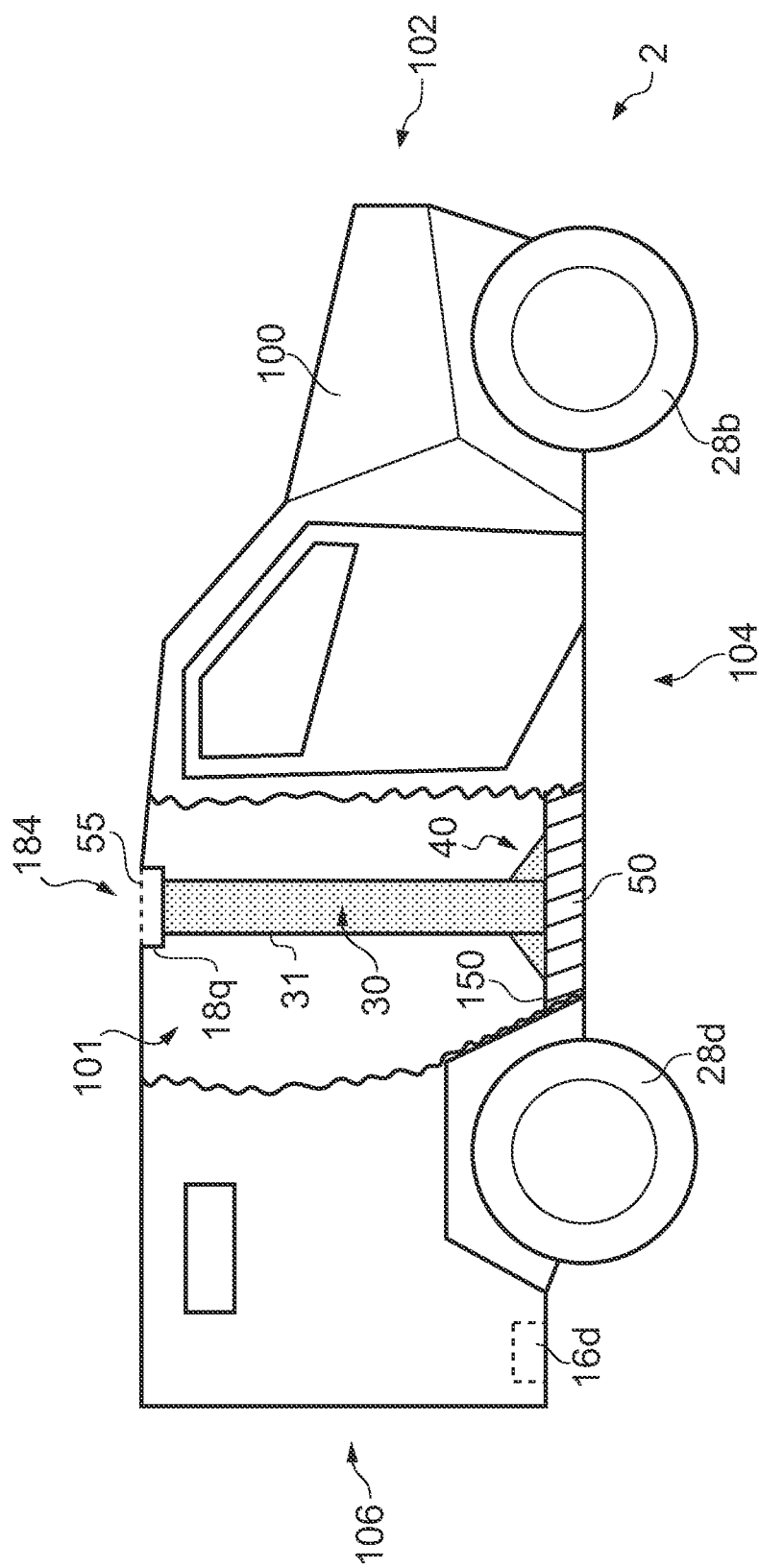
FIG. 12 illustrates a side view of a vehicle, with a portion illustrating the interior of the vehicle.

FIG. 12 illustrates a side view of a vehicle 2 having a structure 30 for transferring the force generated by one or more vehicle stabilizing devices 18*q*-18*u* (in response to an explosion) towards the base 50 of the vehicle 2. The body of the vehicle 2 defines an internal enclosure 101 for housing the occupants of the vehicle 2. FIG. 12 illustrates a portion of the internal enclosure 101.

Figure 13:
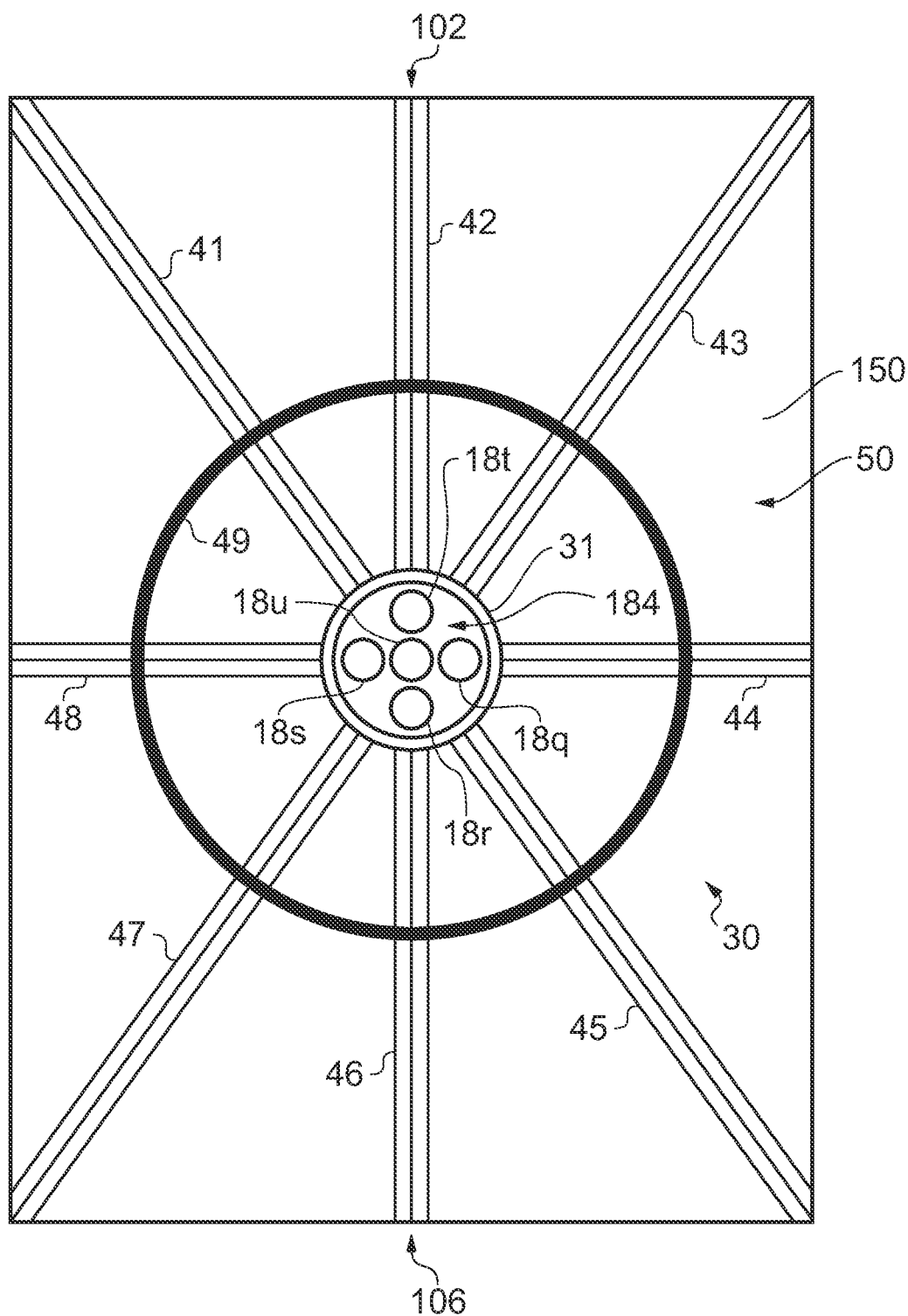
FIG. 13 illustrates a plan view of the base of the vehicle illustrated in FIG. 12.

A plan view of the structure 30 is illustrated in FIG. 13. The reference numerals 102 and 106 (relating to the front and rear of the vehicle respectively) are shown in FIG. 13 to enable the reader to orientate the figure.

The vehicle 2 illustrated in FIGS. 12 and 13 comprises a cluster 184 of vehicle stabilizing devices 18*q*-18*u*. At least one structural member 31 extends from the base 50 of the vehicle to a part of the vehicle 2 where the vehicle stabilizing devices 18*q*-18*u* are situated. In the example illustrated in FIG. 12, the structural member 31 extends through the internal enclosure 101 of the vehicle 2 and the vehicle stabilizing devices 18*q*-18*u* are situated on the structural member 31, substantially level with the roof of the vehicle 2. In other examples, the structural member 31 may extend above the roof or the vehicle may not have a roof.

While only a single structural member 31 is illustrated in FIGS. 12 and 13, in some implementations of the invention, a plurality of structural members may be provided. The structural member 31 illustrated in FIGS. 12 and 13 is a column. However, in other implementations of the invention, the structural member(s) need not take the same form as that illustrated in FIGS. 12 and 13. For example, the structural member(s) may include one or more walls within the interior of the vehicle 2.

The at least one structural member 31 is connected to the base 50 of the vehicle 2 at a surface 150 which may, for example, be an armored layer (which, for instance, may be provided by a belly plate of the vehicle 2). The at least one structural member 31 may, for example, be welded, bolted or otherwise connected to the surface 150. Although not shown in FIGS. 12 and 13, a further surface may be situated above the surface 150, upon which the occupants of the vehicle 2 may place their feet.

Some of the electronics of the apparatus 10 may be housed within the column-shaped structural member 31 in order to protect them. For example, the processor 13 and the memory 20 may be housed within the structural member 31. The detectors 16 may also be housed within the structural member 31. For example, if the detectors 16 are pressure detectors, each pressure detector may be interconnected with a tube extending to the exterior of the vehicle (e.g. the underside of the vehicle 2) to enable the pressure detectors to detect pressure caused by an explosion. In order to ensure that the tubes remain open and capable of allowing the pressure detectors to detect an explosion, a compressor may be used to continuously blow compressed air through the tubes, exiting through open ends of the tubes underneath the vehicle 2.

The at least one structural member 31 acts as a "force channeling means", channeling the force generated by the vehicle stabilizing devices 18*q*-18*u* from the "roof level" of the vehicle 2 towards the base 50.

The structure 30 also comprises force distributing means 40 for distributing the force generated by the vehicle stabilizing devices 18q-18u in a plurality of different directions across the base 50, in order to mitigate damage to the base from the generated force.

The force distributing means 40 comprises a plurality of force distributing members 41-48 that extend outwardly, across the base 50, from the at least one structural member 31. For example, each of the force distributing members 41-48 may be welded, bolted or otherwise connected to the structural member 31 and the base 50 (e.g. at the surface 150). The force distributing means 40 also comprises at least one interconnecting member 49 that interconnects each of the force distributing members 41-48.

When the vehicle stabilizing devices 18q-18u generate a force in response to an explosion, the force channeling means 31 channels the generated force, in a first direction, from the roof of the vehicle 2 towards the base 50. Each of the force distributing members 41-48 then distributes the generated force across the base 50 in a plurality of directions that are substantially perpendicular to the first direction. By dispersing the generated force across the area of the base 50 in this way, damage to the base 50 is mitigated.

Figure 14:
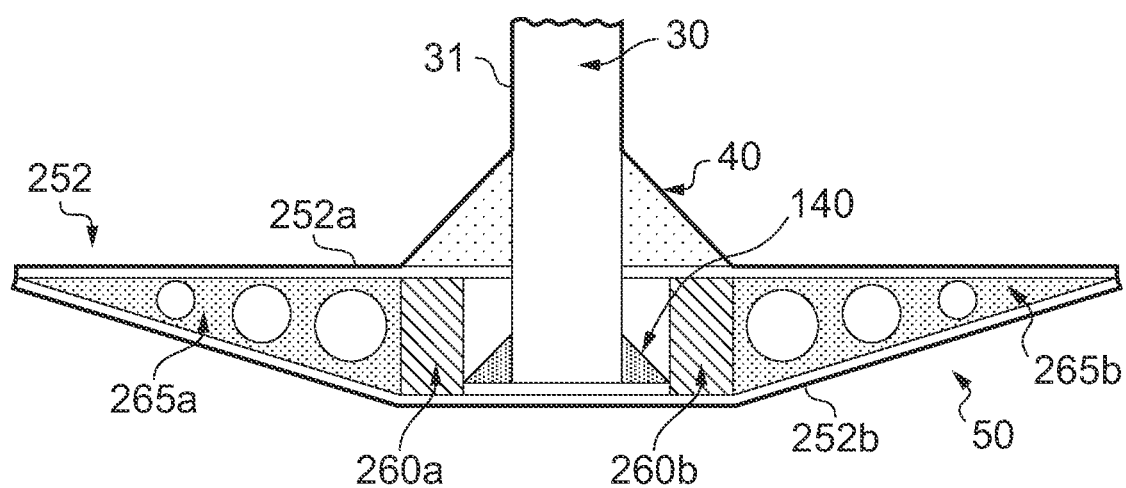
FIG. 14 illustrates a cross section of a first example of a connection between the base of a vehicle and a structural member.

FIG. 14 illustrates an example of a connection between the base 50 of a vehicle 2 and the structural member 31. In this example, the vehicle 2 is a sports utility vehicle where the chassis is separate from the body.

In the FIG. 14 illustration, a two-part belly plate 252 has been fitted to the underside of the vehicle 2. The belly plate 252 provides two armored layers 252a and 252b. The first part 252a of the belly plate 252 has been fitted to the top side of the chassis rails 260a, 260b. The second part 252b of the belly plate 252 has been fitted to the underside of the chassis rails 260a, 260b. The belly plate 252 forms part of the base 50 and may, for example, be made from steel. One or more stiffening ribs 265a, 265b may be provided between the two parts 252a, 252b of the belly plate 252. In the illustrated example, each of the stiffening ribs 265a, 265b comprises lightening holes.

In the example illustrated in FIG. 14, structure 30 passes through the upper part 252a of belly plate 252 and is connected to the lower part 252b of the belly plate 252. Force distributing means 40 (in the form of a plurality of force distributing members) connect the structural member 31 to the upper part 252a of the belly plate 252, and are arranged to distribute the force(s) generated by the vehicle stabilizing devices 18 across the upper part 252a of the belly plate 252. Further force distributing means 140 (in the form of a plurality of further force distributing members) connect the structural member 31 to the lower part 252b of the belly plate 252, and are arranged to distribute the force(s) generated by the vehicle stabilizing devices 18 across the lower part 252b of the belly plate 252.

Figure 15:
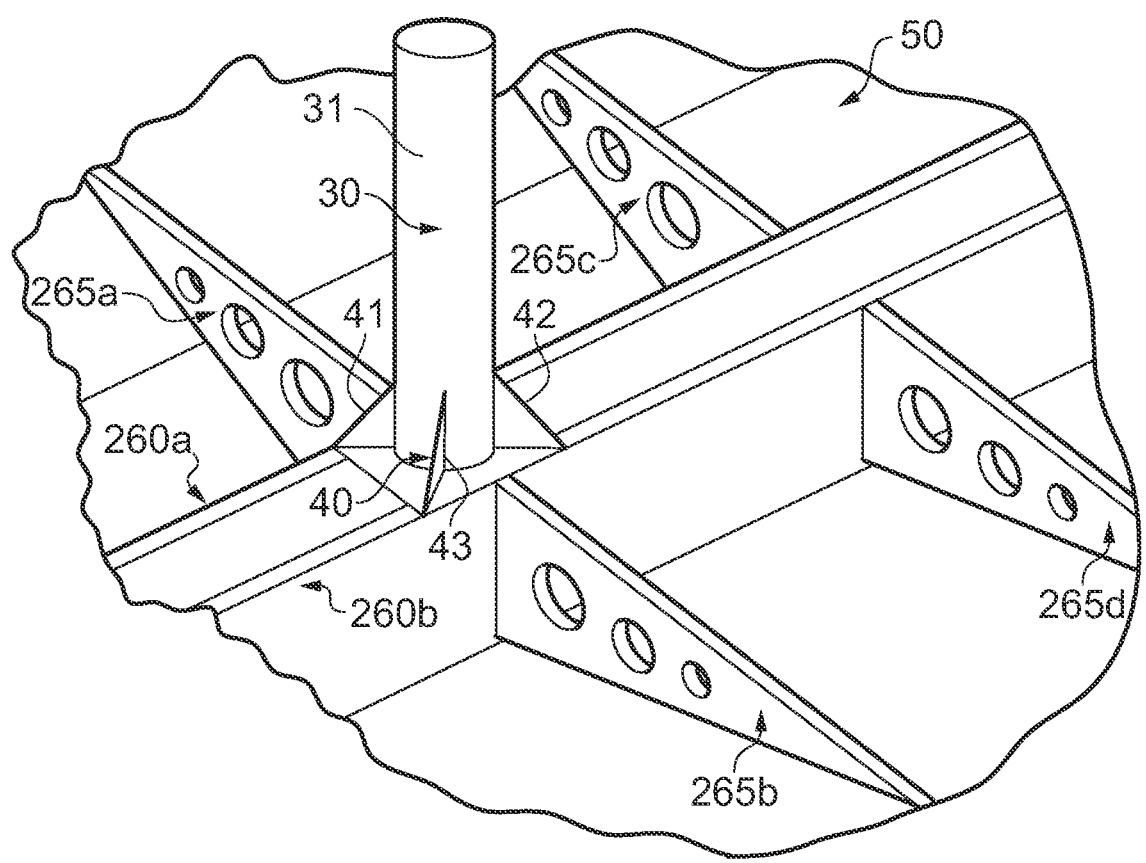
FIG. 15 illustrates a perspective view of the first example of a connection between the base of a vehicle and a structural member.

FIG. 15 illustrates a perspective view of the connection between the base 50 of the vehicle 2 and the structural member 31. However, in FIG. 15 the belly plate 252 is not shown for clarity reasons. Four stiffening ribs 265a-265d are illustrated in FIG. 15.

FIG. 16 illustrates another example of a connection between the base 50 of a vehicle 2 and the structural member 31. In this example, the vehicle 2 is an armored vehicle. The base 50 of the vehicle 2 comprises a V-shaped hull. A belly plate 252 forms at least part of the hull of the vehicle 2.

The structure 30 passes through the floor 51 of the vehicle 2 and an upper part 252a of a belly plate 252. The structure 30 is connected to a lower, v-shaped belly plate 252b via a reinforcing plate 254b and force distributing means 140 (in the form of a plurality of force distributing members). The force distributing members extend from the structural member 31 and are arranged to distribute the force(s) generated by the vehicle stabilizing devices 18 across the lower part 252b of the belly plate 252, with the aid of a reinforcing plate 254b. The structural member 31 is also connected to the upper belly plate 252a by further force distributing means 40 (in the form of a plurality of further force distributing members). The force distributing members are arranged to distribute the force(s) generated by the vehicle stabilizing devices 18 across the upper part 252a of the belly plate 252, with the aid of the reinforcing plate 254a.

An optional joint 70 may be provided around an outer wall 32 of the structural member 31 and above the floor 51 of the vehicle, for support purposes.

Stiffening ribs 265a and 265b, including lightening holes, are provided between the parts 252a and 252b of the belly plate 252.

An internal space 72 is provided between the floor 51 and the upper part 252a of the belly plate 252 to allow for some deflection of the belly plate 252, in the event of an explosion.

It may be that the vehicle 2 comprises one or more weapons. The firing of a weapon may result in shockwaves, causing an increase in pressure local to the vehicle 2. The functional processing circuitry 12 may be configured to receive an input from the weapon (or other electronic circuitry connected to the weapon) indicating that the weapon has been fired. This enables the functional processing circuitry 12 to differentiate between a local increase in pressure caused by a blast shockwave from a hostile explosion, and a shockwave caused by the vehicle's weaponry.

The blocks illustrated in FIG. 5 may represent steps in a method and/or sections of code in the computer program 21. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, in some alternative embodiments of the invention, the functional processing circuitry 12 may not use stored control information to determine how to control the vehicle stabilizing devices 18 in response to a detected increase in pressure. The functional processing circuitry 12 may merely activate the vehicle stabilizing devices 18 if the input from the pressure detectors 16 indicates that the pressure has increased above a threshold level.

Figure 17A:
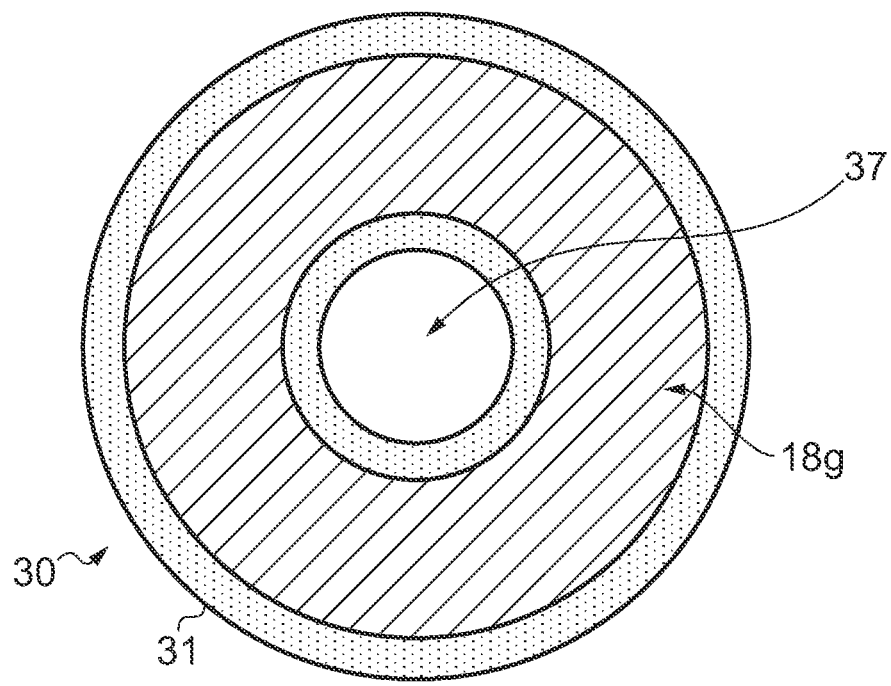
FIG. 17A illustrates a plan view of a vehicle stabilizing device.
Figure 17B:
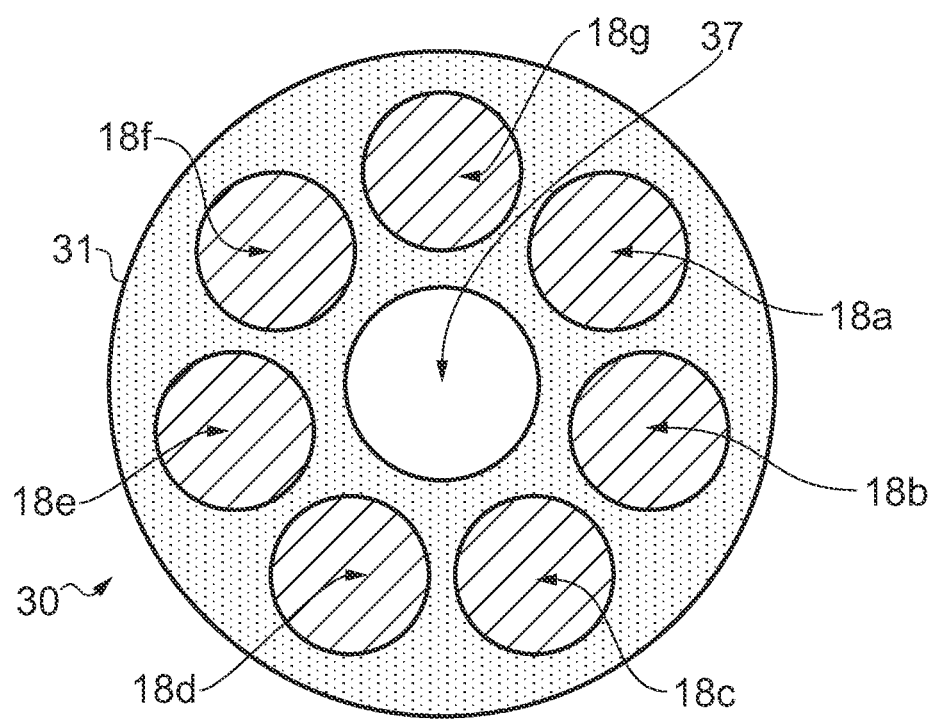
FIG. 17B illustrates a plan view of an arrangement of vehicle stabilizing devices.

In the embodiments of the invention described in relation to FIGS. 12 and 13, five separate vehicle stabilizing devices 18q-18u are present. In an alternative embodiment illustrated in FIG. 17A, a single vehicle stabilizing device 18g having an annular outlet for the non-gaseous mass 52 is provided. The reference numeral 37 denotes an optional aperture in the structural member 31. In another alternative embodiment, more than five vehicle stabilizing devices 18 may be provided. FIG. 17B illustrates an example in which seven vehicle stabilizing device 18a-18g are provided. The reference numeral 37 denotes an optional aperture in the structural member 31.

In the illustrated embodiments of the invention, the vehicle stabilizing devices 18 are attached to the roof of the vehicle 2. However, it will be appreciated by those skilled in the art that the vehicle stabilizing devices 18 could be situated in a number of other positions in or on the vehicle 2, such as in the wings or in the engine bay above the front wheel suspension points.

The vehicle 2 is illustrated in FIGS. 2 and 3 as having wheels 28a to 28d that do not run on tracks. However, in some embodiments of the invention, the vehicle 2 may comprise wheels that run on tracks (e.g. where the vehicle 2 is a tank).

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A vehicle, comprising:
   one or more detectors positioned to detect an explosion underneath an underside of the vehicle;
   a housing, positioned on an exterior surface of the vehicle that is different from the underside of the vehicle, for housing at least one projectile that is separably ejectable from the housing in an upwards direction away from ground; and
   processing circuitry configured to respond to at least one input from the one or more detectors that is indicative of an explosion having occurred underneath the vehicle, by causing ejection of the at least one projectile in the upwards direction out of the housing and away from ground and the explosion, which causes a reactionary groundwards force to be applied to the vehicle in order to stabilize the vehicle in response to the explosion.

2. The vehicle as recited in claim 1, further comprising multiple housings for housing multiple projectiles that are separately ejectable from the multiple housings in an upwards direction away from ground.

3. The vehicle as recited in claim 2, wherein the processing circuitry is configured to respond to the at least one input from the one or more detectors that is indicative of an explosion having occurred underneath the vehicle, by causing sequential ejection of the multiple projectiles out of the multiple housings and away from ground.

4. The vehicle as recited in claim 3, wherein the processing circuitry is configured to cause sequential ejection of the multiple projectiles in a predetermined order that depends upon the at least one input provided by the one or more detectors.

5. The vehicle as recited in claim 1, further comprising:
   a structure that is configured to channel the reactionary groundwards force from the housing to a base of the vehicle; and
   distributing members configured to distribute the reactionary groundwards force in a plurality of different directions across the base, in order to mitigate damage to the base from the reactionary groundwards force.

6. The vehicle as recited in claim 5, wherein the structure extends through an internal enclosure of the vehicle.

7. A vehicle, comprising:
   one or more detectors positioned to detect an explosion, local to the vehicle, occurring on or in ground;
   a housing, positioned on an exterior surface of the vehicle, for housing at least one projectile that is separably ejectable from the housing in an upwards direction away from ground; and
   processing circuitry configured to respond to at least one input from the one or more detectors that is indicative of an explosion having occurred in or on ground local to the vehicle, by causing ejection of the at least one projectile in the upwards direction out of the housing and away from ground and the explosion, which causes a reactionary groundwards force to be applied to the vehicle in order to stabilize the vehicle in response to the explosion.

8. The vehicle as recited in claim 7, wherein the processing circuitry is configured to respond to the at least one input from the one or more detectors that is indicative of an explosion having occurred in or on ground by causing the at least one projectile to be ejected within 5 milliseconds of detection of the explosion occurring in or on ground.

9. The vehicle as recited in claim 7, wherein the processing circuitry is configured to respond to the at least one input from the one or more detectors that is indicative of an explosion having occurred in or on ground by causing the at least one projectile to be ejected within 1 millisecond of detection of the explosion occurring in or on ground.

10. The vehicle as recited in claim 7, wherein the processing circuitry is configured to control at least one exploding detonator to cause the at least one projectile to be ejected.

11. The vehicle as recited in claim 10, wherein the at least one exploding detonator comprises at least one explosive which is configured to cause at least one other explosive, external to the at least one exploding detonator, to detonate in order to eject the at least one projectile.

12. The vehicle as recited in claim 10, further comprising:
   at least one chamber for containing pressurized gas, and the at least one exploding detonator is configured to break at least one wall of the at least one chamber to eject the at least one projectile.

13. The vehicle as recited in claim 7, further comprising: at least one chamber for containing inflammable gas, and the processing circuitry is configured to cause ignition of the inflammable gas, in order to eject the at least one projectile.

14. The vehicle as recited in claim 7, wherein the processing circuitry is configured to respond to the at least one input from the one or more detectors that is indicative of an explosion having occurred in or on ground by causing sequential ejection of a plurality of projectiles.

15. The vehicle as recited in claim 7, wherein the processing circuitry is configured to decide, based on the at least one input from the one or more detectors, which projectile or projectiles to eject from a plurality of ejectable projectiles.

16. The vehicle as recited in claim 7, wherein a direction in which the reactionary groundwards force is applied to the vehicle is opposite to the upwards direction in which the at least one projectile is ejected.

17. The vehicle as recited in claim 7, further comprising multiple housings for housing multiple projectiles that are separately ejectable from the multiple housings in an upwards direction away from ground.

18. The vehicle as recited in claim 17, wherein the processing circuitry is configured to respond to the at least one input from the one or more detectors that is indicative of an explosion having occurred in or on ground local to the vehicle, by causing sequential ejection of the multiple projectiles out of the multiple housings and away from ground.

19. The vehicle as recited in claim 18, wherein the processing circuitry is configured to cause sequential ejection of the multiple projectiles in a predetermined order that depends upon the at least one input provided by the one or more detectors.

20. A method, comprising:
receiving at least one input from one or more detectors that is indicative of an explosion having occurred in or on ground local to a vehicle; and
responding to the at least one input from the one or more detectors that is indicative of an explosion having occurred in or on ground local to the vehicle by causing ejection of at least one projectile, housed in a housing positioned on an exterior surface of the vehicle, in an upwards direction out of the housing and away from ground and the explosion, which causes a reactionary groundwards force to be applied to the vehicle in order to stabilize the vehicle in response to the explosion.

21. The method as recited in claim 20, further comprising sequentially ejecting a plurality of projectiles in response to detection of the explosion occurring in or on ground.

22. An apparatus, comprising:
one or more detectors for detecting an explosion underneath an underside of a vehicle;
a housing, positionable on an exterior surface of the vehicle that is different from the underside of the vehicle, for housing at least one projectile that is separately ejectable from the housing in an upwards direction away from ground when the housing is positioned on an exterior surface of the vehicle; and
processing circuitry configured to respond to at least one input from the one or more detectors that is indicative of an explosion having occurred underneath the vehicle, by causing ejection of the at least one projectile in the upwards direction out of the housing and away from ground and the explosion, which causes a reactionary groundwards force to be applied to the vehicle in order to stabilize the vehicle in response to the explosion.

23. An apparatus, comprising:
one or more detectors for detecting an explosion, local to a vehicle, occurring on or in ground;
a housing, positionable on an exterior surface of the vehicle, for housing at least one projectile that is separately ejectable from the housing in an upwards direction away from ground when the housing is positioned on an exterior surface of the vehicle; and
processing circuitry configured to respond to at least one input from the one or more detectors that is indicative of an explosion having occurred in or on ground local to the vehicle, by causing ejection of the at least one projectile in the upwards direction out of the housing and away from ground and the explosion, which causes a reactionary groundwards force to be applied to the vehicle in order to stabilize the vehicle in response to the explosion.

* * * * *